(12) United States Patent
Wang et al.

(10) Patent No.: US 11,279,434 B2
(45) Date of Patent: Mar. 22, 2022

(54) STEM ASSEMBLY AND ELECTRIC VEHICLE

(71) Applicant: Ninebot (Changzhou) Tech Co., Ltd., Jiangsu (CN)

(72) Inventors: Can Wang, Jiangsu (CN); Xuanyu Huang, Jiangsu (CN)

(73) Assignee: Ninebot (Changzhou) Tech Co., Ltd, Jiangsu (CN)

( * ) Notice: Subject to any disclaimer, the term of this patent is extended or adjusted under 35 U.S.C. 154(b) by 0 days.

(21) Appl. No.: 17/324,701

(22) Filed: May 19, 2021

(65) Prior Publication Data

US 2021/0371042 A1 Dec. 2, 2021

(30) Foreign Application Priority Data

May 26, 2020 (CN) .......................... 202010457911.2

(51) Int. Cl.
*B62K 21/16* (2006.01)
*B62K 11/02* (2006.01)
*B62K 15/00* (2006.01)

(52) U.S. Cl.
CPC .............. *B62K 21/16* (2013.01); *B62K 11/02* (2013.01); *B62K 15/00* (2013.01)

(58) Field of Classification Search
None
See application file for complete search history.

(56) References Cited

FOREIGN PATENT DOCUMENTS

| CN | 203819440 U | | 9/2014 |
| CN | 205589381 U | * | 9/2016 |
| CN | 108974223 A | * | 12/2018 |
| FR | 3054520 A1 | | 2/2018 |
| JP | H08324479 A | | 12/1996 |
| JP | H10129564 A | | 5/1998 |

OTHER PUBLICATIONS

European Patent Office, Search Report for EP application 21175236.5, dated Sep. 24, 2021.

* cited by examiner

*Primary Examiner* — Vicky A Johnson
(74) *Attorney, Agent, or Firm* — Timothy W. Menasco, Esq.; Harter Secrest & Emery LLP

(57) ABSTRACT

A stem assembly and an electric vehicle are provided. The stem assembly includes: a stem telescoping mechanism including a first hollow tube, a second hollow tube, and a locking mechanism, the locking mechanism having a locked state and an movable state; a handle folding mechanism arranged to the stem telescoping mechanism, the handle folding mechanism including a handle assembly and a first limiting member, the first limiting member being movably arranged, and having a first limiting position and a first evading position; and a driving mechanism connected to both the locking mechanism and the first limiting member, and configured to be operated to control the stem telescoping mechanism and the handle folding mechanism to synchronously move.

20 Claims, 18 Drawing Sheets

STEM ASSEMBLY AND ELECTRIC VEHICLE

CROSS-REFERENCE TO RELATED APPLICATION

This application claims the benefit of priority to Chinese patent Application No. 202010457911.2, filed on May 26, 2020, the content of which is incorporated herein by reference in its entirety.

FIELD

The present disclosure relates to a technical field of electric vehicles, and more particularly to a stem assembly and an electric vehicle.

BACKGROUND

At present, an electric scooter in the related art is generally folded into a small volume by folding a stem, telescoping the stem, and folding a handle, so as to save space and facilitate accommodation.

However, the electric scooter in the related art generally requires a user to fold the stem, telescope the stem, and fold the handle respectively, which makes a folding process complicated, and fails to meet the user's comfortable experiences.

SUMMARY

According to an aspect of the present disclosure, a stem assembly is provided, including: a stem telescoping mechanism including a first hollow tube, a second hollow tube, and a locking mechanism, the locking mechanism having a locked state and a movable state, the second hollow tube being configured to be fixedly connected to the first hollow tube when the locking mechanism is in the locked state, and to be movably arranged in the first hollow tube when the locking mechanism is in the movable state; a handle folding mechanism arranged to the stem telescoping mechanism, the handle folding mechanism including a handle assembly and a first limiting member, the first limiting member being movably arranged, and having a first limiting position and a first evading position, at least part of the first limiting member being configured to be engaged with the handle assembly to restrict a movement of the handle assembly when the first limiting member is at the first limiting position, and the first limiting member being configured to evade the handle assembly to allow the handle assembly to be movably arranged when the first limiting member is at the first evading position; and a driving mechanism connected to both the locking mechanism and the first limiting member, and configured to be operated to control the stem telescoping mechanism and the handle folding mechanism to synchronously move.

According to another aspect of the present disclosure, an electric vehicle is provided. The electric vehicle includes a stem assembly. The stem assembly includes: a stem telescoping mechanism including a first hollow tube, a second hollow tube, and a locking mechanism, the locking mechanism having a locked state and a movable state, the second hollow tube being configured to be fixedly connected to the first hollow tube when the locking mechanism is in the locked state, and to be movably arranged in the first hollow tube when the locking mechanism is in the movable state; a handle folding mechanism arranged to the stem telescoping mechanism, the handle folding mechanism including a handle assembly and a first limiting member, the first limiting member being movably arranged, and having a first limiting position and a first evading position, at least part of the first limiting member being configured to be engaged with the handle assembly to restrict a movement of the handle assembly when the first limiting member is at the first limiting position, and the first limiting member being configured to evade the handle assembly to allow the handle assembly to be movably arranged when the first limiting member is at the first evading position; and a driving mechanism connected to both the locking mechanism and the first limiting member, and configured to be operated to control the stem telescoping mechanism and the handle folding mechanism to synchronously move.

It is to be understood that both the foregoing general description and the following detailed description are illustrative and explanatory only and are not restrictive of the present disclosure, as claimed.

BRIEF DESCRIPTION OF THE DRAWINGS

The accompanying drawings constituting a part of the specification of the present disclosure are used to provide a further understanding of the present disclosure. Schematic embodiments of the present disclosure and descriptions thereof are used to interpret the present disclosure, and are not intended to inappropriately limit the present disclosure.

DETAILED DESCRIPTION

Figure 1:
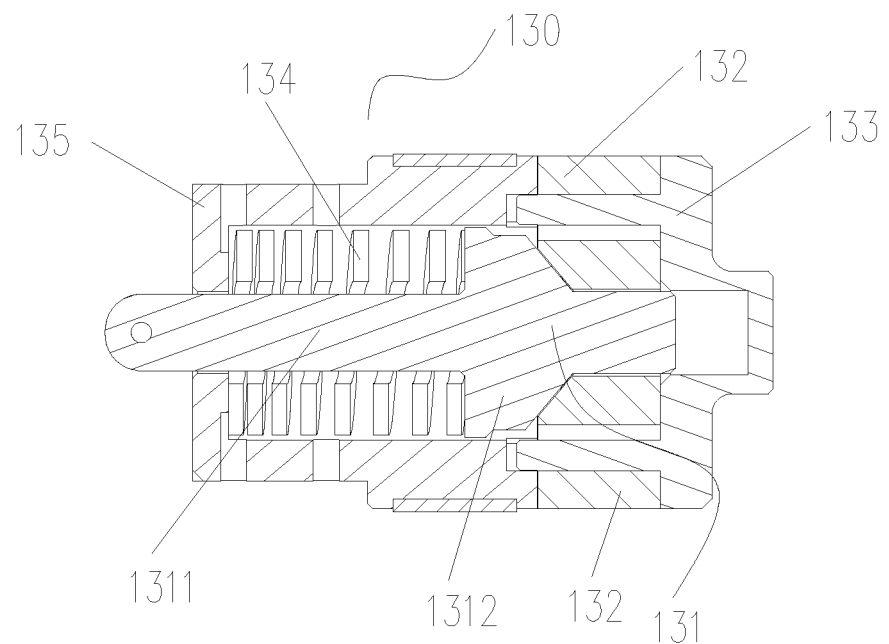
FIG. 1 is a schematic view of a first locking structure of a stem telescoping mechanism according to an embodiment of the present disclosure.
Figure 2:
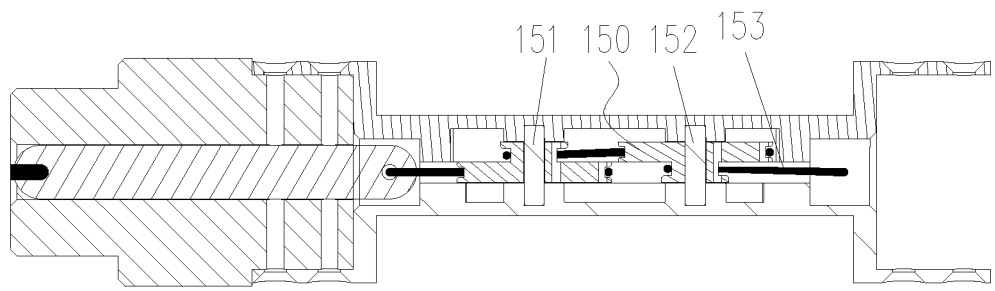
FIG. 2 is a schematic view of an amplification assembly of a stem telescoping mechanism according to an embodiment of the present disclosure.
Figure 3:
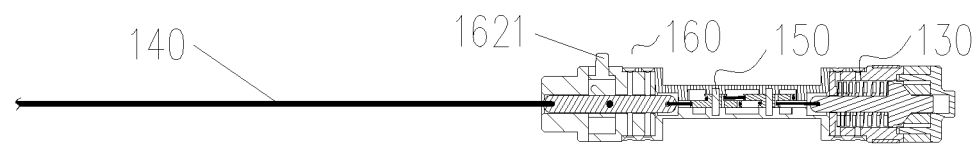
FIG. 3 is a partial schematic view of a stem telescoping mechanism according to an embodiment of the present disclosure.
Figure 4:
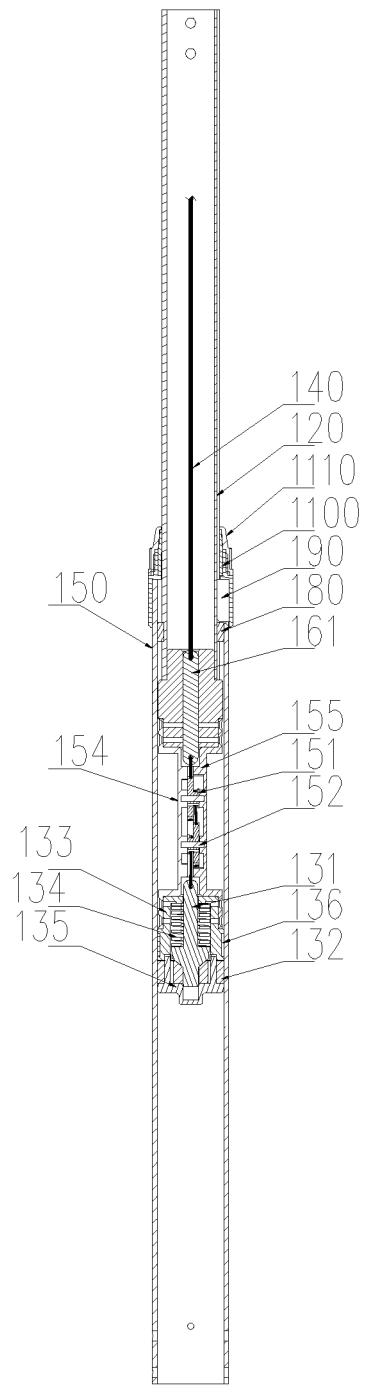
FIG. 4 is a sectional view of a stem telescoping mechanism according to an embodiment of the present disclosure.
Figure 5:
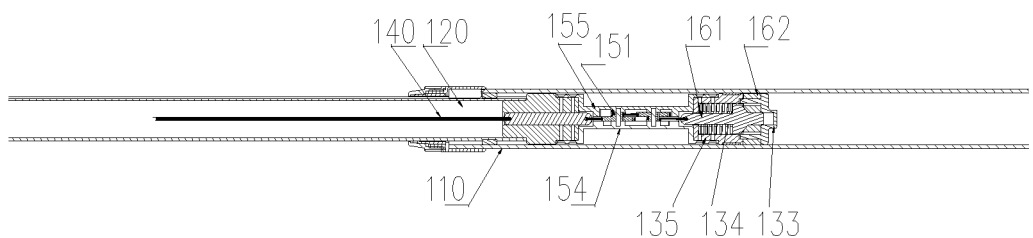
FIG. 5 is a sectional view of a partial structure of a stem telescoping mechanism according to an embodiment of the present disclosure.

It is to be noted that embodiments in the present disclosure and features in the embodiments may be combined with each other without a conflict. The present disclosure will be described in detail below with reference to the drawings and in combination with the embodiments.

As illustrated in FIG. 1 to FIG. 30, an embodiment of the present disclosure provides a stem assembly. The stem assembly includes a stem telescoping mechanism 10, a handle folding mechanism 20, and a driving mechanism. The stem telescoping mechanism 10 includes a first hollow tube 110, a second hollow tube 120, and a locking mechanism. The locking mechanism has a locked state and a movable state. When the locking mechanism is in the locked state, the second hollow tube 120 is fixedly connected to the first hollow tube 110. When the locking mechanism is in the movable state, the second hollow tube 120 is movably arranged in the first hollow tube 110. The handle folding mechanism 20 is arranged to the stem telescoping mechanism 10. The handle folding mechanism 20 includes a handle assembly 220 and a first limiting member 230, and the first limiting member 230 is movably arranged, so that the first limiting member 230 has a first limiting position and a first evading position. When the first limiting member 230 is at the first limiting position, at least part of the first limiting member 230 is engaged with the handle assembly 220 to restrict movements of the handle assembly 220. When the first limiting member 230 is at the first evading position, the first limiting member 230 evades the handle assembly 220 so that the handle assembly 220 is movably arranged. The locking mechanism and the first limiting member 230 are both connected to the driving mechanism, so that the stem telescoping mechanism 10 and the handle folding mechanism 20 are controlled to synchronously move by operating the driving mechanism.

In the stem assembly according to the embodiment of the present disclosure, the locking structure and the first limiting member 230 are both connected to the driving mechanism, such that the movements of the locking structure and the first limiting member 230 can be simultaneously controlled by operating the driving mechanism, and thus it is convenient for the stem telescoping mechanism 10 to perform a telescopic operation and for the handle folding mechanism 20 to perform folding and unfolding operations. The movements of two mechanisms can be simultaneously realized through one driving mechanism, thus facilitating a user's operations and improves the convenience of operation. Therefore, the technical problem of complicated operations of the stem assembly in the related art can be solved through the stem assembly according to the embodiments of the present.

Specifically, the driving mechanism in the embodiment of the present disclosure includes a driving block 270. The driving block 270 is arranged to the handle folding mechanism 20, and a driving end of the driving block 270 is drivingly connected to the first limiting member 230, so that the handle assembly 220 is driven to move through the driving block 270. With such arrangements, it is convenient for the first limiting member 230 to move to the first limiting position or the first evading position by operating the driving block 270, so that the handle assembly 220 can be folded or unfolded easily, thus further improving the convenience of operation.

Specifically, the driving mechanism in the embodiment of the present disclosure further includes a driving rope 140. One end of the driving rope 140 is connected to the driving block 270, and the other end of the driving rope 140 is connected to the locking mechanism, so that the movement of the locking mechanism can be controlled through the driving rope 140 when the driving block 270 is operated to pull the driving rope 140. With such arrangements, the locking mechanism can be driven to move through the driving rope 140 while the driving block 270 is being driven, so that it is convenient for the locking mechanism to move to the locked state or the movable state, and thus the telescoping of the stem can be controlled easily, thereby further improving the convenience of operation.

In the embodiment of the present disclosure, the stem assembly further includes a stem folding mechanism 30. The stem folding mechanism 30 includes a first folding seat 310, a second folding seat 320, and a limiting structure. The limiting structure includes a second limiting member 330. The second folding seat 320 is arranged to an end of the stem telescoping mechanism 10 away from the handle folding mechanism 20. The second limiting member 330 is movably arranged to the first folding seat 310. The second limiting member 330 has a second limiting position and a second evading position. When the second limiting member 330 is at the second limiting position, the second limiting member 330 is engaged with the second folding seat 320 to restrict movements of the second folding seat 320. When the second limiting member 330 is at the second evading position, the second limiting member 330 evades the second folding seat 320, so that the second folding seat 320 is rotatably arranged to the first folding seat 310. By changing the position of the second limiting member 330, relative motion states of the first folding seat 310 and the second folding seat 320 can be easily changed, so that the second folding seat 320 is folded or unfolded, and the stem assembly and an electric vehicle are further folded. Moreover, the convenience of operation is also improved.

Specifically, the stem telescoping mechanism 10 in the embodiment of the present disclosure further includes a first driving member, and the first driving member is arranged to an end of the second hollow tube 120 away from the handle folding mechanism 20. Specifically, the first driving member is a tail cover 1120, so as to allow the second limiting member 330 to move to the second evading position when the second hollow tube 120 in the first hollow tube 110 moves to make the first driving member abut against at least part of the limiting structure. With such arrangements, when the user folds the stem assembly, the driving block 270 is driven to move, and the driving block 270 drives the first limiting member 230 to move, so that the handle assembly 220 is folded. At the same time, the driving block 270 drives the driving rope 140 to move, so as to pull the locking mechanism to move through the driving rope 140 and thus to make the stem telescoping mechanism 10 perform a telescoping operation. When the second hollow tube 120 of the stem telescoping mechanism 10 moves to a position where it abuts against at least part of the limiting structure, the second limiting member 330 moves to the second evading position, so that the second folding seat 320 is folded relative to the first folding seat 310, thereby completing the folding of the whole vehicle, and hence improving the convenience of operation.

In the embodiment of the present disclosure, as illustrated in FIG. 21 to FIG. 25, the limiting structure further includes a folding driving assembly. A driving end of the folding driving assembly is configured to be drivingly connected to the second limiting member 330, and the first driving member is configured to abut against the folding driving assembly, so that the first driving member is configured to drive the second limiting member 330 to move through the folding driving assembly, thereby improving the convenience of operation.

In the embodiment of the present disclosure, the first folding seat 310 is provided with a first mounting slot 311, at least part of the second folding seat 320 is rotatably arranged in the first mounting slot 311, and the second limiting member 330 is movably arranged in the first mounting slot 311, so that the second limiting member 330 moves to the limiting position or the evading position. With such arrangements, the position of the second limiting member 330 in the first mounting slot 311 can be changed easily to allow the second limiting member 330 to move to the second limiting position or the second evading position, so as to facilitate the control over a motion state of the second folding seat 320, thus ensuring folding and unfolding stability.

Specifically, the first folding seat 310 in the embodiment of the present disclosure includes a first base 312, a first base plate 313, and a second base plate 314. The first base plate 313 and the second base plate 314 are arranged on the first base 312 and spaced apart. The first base plate 313 and the second base plate 314 arranged oppositely to define the first mounting slot 311. With such arrangements, the arrangement rationality of the overall structure can be improved, so that the second folding seat 320 is rotatably arranged between the first base plate 313 and the second base plate 314, thus optimizing the layout of the structure and improving the compactness of the structure.

In the embodiment of the present disclosure, the first folding seat 310 is provided with a guide slot 315, and the second limiting member 330 is movably arranged in the guide slot 315, so that the second limiting member moves to the second limiting position or second evading position in the guide slot 315. With such arrangements, motion stability of the second limiting member 330 can be improved, so that the second limiting member 330 can smoothly move to the second limiting position or second evading position. The first folding seat 310 in the embodiment further includes a guide rail insert 317. The guide slot 315 is formed in the guide rail insert 317. The second limiting member 330 slides up and down in the guide slot 315 of the guide rail insert 317. The second folding seat 320 may rotate clockwise along a rotating shaft 350. A stem is arranged to the second folding seat 320.

Specifically, the guide slot 315 may be arranged to the first base plate 313, or the guide slot 315 is arranged to the second base plate 314, or each of the first base plate 313 and the second base plate 314 is provided with the guide slot 315. In the embodiment of the present disclosure, in order to further enable the second limiting member 330 to move smoothly, each of the first base plate 313 and the second base plate 314 is provided with the guide slot 315, so as to better guide the movement of the second limiting member 330 through the guide slot 315, thereby ensuring that the second limiting member 330 can stably move to the second limiting position or second evading position.

In the embodiment of the present disclosure, the second folding seat 320 is provided with a first engaging slot 321, and the first engaging slot 321 matches the second limiting member 330 in shape. When the second limiting member 330 is at the limiting position, the second limiting member 330 is engaged in the first engaging slot 321. When the second limiting member 330 is at the second evading position, the second limiting member 330 evades the first engaging slot 321. With such arrangements, the limiting stability of the second limiting member 330 is improved.

Specifically, the second folding seat 320 in the embodiment of the present disclosure includes a second base 322, a third base plate 323, a fourth base plate 324, and a limiting insert 325. The third base plate 323 and the fourth base plate 324 are both arranged on the second base 322. The third base plate 323 and the fourth base plate 324 are spaced apart. The third base plate 323 and the fourth base plate 324 define an evading passage. One end of the limiting insert 325 is arranged to the third base plate 323, and the other end of the limiting insert 325 is arranged to the fourth base plate 324. The first engaging slot 321 is formed in the limiting insert 325. The first engaging slot 321 has a structure of an open slot. The first engaging slot 321 is in communication with the evading passage. Specifically, two limiting inserts 325 are provided. The two limiting inserts 325 are spaced apart. The two limiting inserts 325 are arranged oppositely on two sides of the evading passage, so that the second limiting member 330 can run through two first engaging slots 321 and the evading passage between the two first engaging slots 321. With such arrangements, the arrangement rationality of the overall structure can be improved, so that the second limiting member 330 is movably arranged between the third base plate 323 and the fourth base plate 324 and can move to a position where it is engaged in or evades the first engaging slot 321, which optimizes the layout of the structure and improves the compactness of the structure.

In order to further improve the convenience of operation, the stem folding mechanism 30 in the embodiment of the present disclosure further includes a driving assembly. A driving end of the driving assembly is configured to abut against the second limiting member 330, so that the second limiting member 330 can be driven to move through the driving assembly.

Specifically, the driving assembly includes a third driving member 341. The third driving member 341 is movably arranged to the second folding seat 320. The third driving member 341 is configured to push the second limiting member 330 to move. The third driving member 341 in the embodiment of the present disclosure may be a push rod. The push rod is movably arranged to the second folding seat 320, so that the second limiting member 330 can pushed to move through the push rod.

Specifically, the stem folding mechanism 30 in the embodiment of the present disclosure further includes a rotating shaft 350. The rotating shaft 350 is arranged to the first folding seat 310. The third driving member 341 is arranged through the second folding seat 320. The third driving member 341 is further provided with an evading hole 3411. The evading hole 3411 is configured to evade the rotating shaft 350. The rotating shaft 350 is movably arranged through the evading hole 3411, so that the first folding seat 310 can rotate relative to the second folding seat 320 through the rotating shaft 350. With such arrangements, the compactness of the structure can be further improved, the space layout of the structure is further optimized, and the stability of the movement is ensured.

In the embodiment of the present disclosure, the driving assembly further includes a fourth driving member 342. The fourth driving member 342 is rotatably arranged. The fourth driving member 342 is drivingly connected to the third driving member 341. Specifically, the fourth driving member 342 has a connecting end and a driving end arranged oppositely, the connecting end of the fourth driving member 342 is drivingly connected to the third driving member 341, and the driving end of the fourth driving member 342 is located outside the folding structure, so that an operator can control the movement of the third driving member 341 by operating the fourth driving member 342 and then the second limiting member 330 can be pushed to move through the third driving member 341. Specifically, the stem folding mechanism 30 in the embodiment of the present disclosure may be applied to the stem of a scooter, the driving end of the fourth driving member 342 is located outside the stem, and the fourth driving member 342 can push the third driving member 341 to move by the user pressing the fourth driving member 342.

Specifically, the fourth driving member 342 is a crank. By pressing the crank outside the stem with hands, the crank may press down the third driving member 341. The third driving member 341 jacks up the second limiting member 330 out of the first engaging slot 321 of the limiting insert 325. After the second limiting member 330 is separated from the first engaging slot 321, the limiting between the second folding seat 320 and the first folding seat 310 has disappeared, and hence the second folding seat 320 can rotate around the rotating shaft 350, so to enable the second folding seat 320 to move to a folded state.

Specifically, the stem folding mechanism 30 in the embodiment of the present disclosure further includes a first resetting member 360. The first resetting member 360 has a connecting end and a first resetting end arranged oppositely. The connecting end of the first resetting member 360 is arranged to the first folding seat 310. The first resetting end of the first resetting member 360 is configured to drive the second limiting member 330 to reset. With such arrangements, when the second limiting member 330 is at the second evading position, the second folding seat 320 can move to the folded state. Afterwards, in the process of rotating the second folding seat 320 from the folded state to an unfolded state, the second limiting member 330 may be driven to reset from the second evading position to the second limiting position under the action of the first resetting member 360, so that the second folding seat 320 is stably restricted to the unfolded state.

In order to improve the stability of resetting, two first resetting members 360 are provided in the embodiment of the present disclosure. A resetting end of one first resetting member 360 is arranged to one end of the second limiting member 330, and a resetting end of the other first resetting member 360 is arranged to the other end of the second limiting member 330. In the embodiment of the present disclosure, the stem folding mechanism 30 further includes a second resetting member 370. Specifically, the first resetting member 360 is arranged at the guide slot 315 of the first base plate 313, and the second resetting member 370 is arranged at the guide slot 315 of the second base plate 314, so as to further improve the stability of resetting. Specifically, the second resetting member 370 in the embodiment of the present disclosure is a resetting tension spring.

The second resetting member 370 has a second resetting end. The second resetting end is configured to abut against at least part of the third driving member 341, so that the third driving member 341 is driven to reset by the second resetting end. The second resetting member 370 in the embodiment of the present disclosure is a reset spring. The reset spring is fitted over a rod body of the third driving member 341, so that the third driving member 341 can be driven to reset by the reset spring. The stem folding mechanism 30 in the embodiment of the present disclosure further includes a nut 390. The nut 390 is arranged to the rod body of the third driving member 341. One end of the second resetting member 370 abuts against at least part of the rod body, and the other end of the second resetting member 370 abuts against the nut 390, so as to perform resetting through the second resetting member 370, thus improving the stability of resetting of the second folding seat 320.

The stem folding mechanism 30 in the embodiment of the present disclosure further includes a clasp block 316, a first cover plate 381, and a second cover plate 382. The clasp block 316 is arranged to the first base 312, so that other to-be-connected members are clasped through the clasp block 316. The first cover plate 381 is arranged on an outer side of one guide rail insert 317, and the second cover plate 382 is arranged on an outer side of the other guide rail insert 317, so that the guide rail inserts 317 are protected by the first cover plate 381 and the second cover plate 382, so as to improve the appearance aesthetics of the overall structure.

The stem folding mechanism 30 in the embodiment of the present disclosure is mainly applied to the stem. Specifically, the stem is arranged to an end of the second folding seat 320 away from the first folding seat 310. An unfolding process of the stem is as follows: the stem is erected by hands; in this case, the second limiting member 330 in the stem folding mechanism 30, under the action of the first resetting member 360, moves upwards along the guide rail insert 317 and enters the first engaging slot 321 of the limiting insert 325. Since the guide rail insert 317, the limiting insert 325, and the second limiting member 330 form a close-fit relationship, the first folding seat 310 and the second folding seat 320 of the stem folding mechanism 30 are firmly locked, and the stem is kept in a vertical state. The process of locking the stem folding mechanism 30 only requires the user to erect the stem without triggering the stem folding mechanism 30 again, thus simplifying the operation process.

A folding process of the stem is as follows: the crank outside the stem may be pressed by hands, the crank may press down the third driving member 341 in the stem folding mechanism 30, the third driving member 341 jacks up the second limiting member 330 out of the first engaging slot 321 accordingly, the limiting between the second folding seat 320 and the first folding seat 310 has disappeared after the second limiting member 330 is separated from the first engaging slot 321, the second folding seat 320 then can rotate along the rotating shaft 350, and the stem can be folded. Afterwards, the third driving member 341 may return to its original position under the action of the second resetting member 370. Alternatively, the stem is telescopic. An inner tube of the telescopic stem is pressed by hands, a bottom of the inner tube presses down the third driving member 341, and the second limiting member 330 is jacked up from the first engaging slot 321 through the third driving member 341.

Specifically, as illustrated in FIG. 1 to FIG. 5, the locking mechanism in the embodiment of the present disclosure includes a first locking structure 130. The first locking structure 130 is movably arranged in an inner cavity of the first hollow tube 110. The first locking structure 130 is connected to the second hollow tube 120. The first locking structure 130 has a first locked state and a first movable state. When the first locking structure 130 is in the first locked state, at least part of the first locking structure 130 abuts against an inner wall of the first hollow tube 110, so as to restrict movements of the second hollow tube 120. When the first locking structure 130 is in the first movable state, the first locking structure 130 is spaced apart from at least part of the first hollow tube 110, so that the second hollow tube 120 is movably arranged in the inner cavity of the first hollow tube 110.

In the stem telescoping mechanism 10 provided in the embodiment of the present disclosure, the movement of the second hollow tube 120 in the first hollow tube 110 can be easily controlled by controlling a state of the first locking structure 130, so that the second hollow tube 120 can be moved to any position in the first hollow tube 110, thereby facilitating a random adjustment of the overall height of the stem telescoping mechanism 10 according to an actual requirement of the user, and thus improving the convenience of operation.

In the embodiment of the present disclosure, the driving mechanism includes a driving block 270 and a driving rope 140. The driving block 270 is drivingly connected to the first limiting member 230, and the driving rope 140 is connected to the driving block 270. The first locking structure 130 includes a first push rod 131 and a first locking block 132. The first push rod 131 is connected to the driving rope 140.

The first push rod 131 is configured to abut against the first locking block 132, so that the first locking block 132 is pushed by the first push rod 131 to move to a first locked position or a first evading position. When the first locking block 132 is at the first locked position, the first locking block 132 abuts against the inner wall of the first hollow tube 110, so that the first locking structure 130 is in the first locked state. When the first locking block 132 is at the first evading position, the first locking block 132 evades the inner wall of the first hollow tube 110, so that the first locking structure 130 is in the first movable state. With such arrangements, the movement of the first locking block 132 can be easily controlled through the first push rod 131, which improves the convenience of operation.

In the embodiment of the present disclosure, the first push rod 131 has a driving surface, the first locking block 132 has a push surface fitted with the driving surface, the driving surface and the push surface are arranged oppositely, and the driving surface abuts against the push surface, so that the first locking block 132 can move to the first locked position or first evading position. With such arrangements, the first locking block 132 can be better driven to move to the first locked position or the first evading position through the fit between the driving surface and the push surface. Specifically, the driving surface and the push surface in the embodiment of the present disclosure may be inclined surfaces or conical surfaces fitted with each other, so as to push the first locking block 132 to move more smoothly.

Specifically, a plurality of first locking blocks 132 are provided in the embodiment of the present disclosure. The plurality of first locking blocks 132 are arranged annularly, and the plurality of first locking blocks 132 are spaced apart on the first push rod 131. Specifically, the plurality of first locking blocks 132 are spaced apart in a circumferential direction of the first push rod 131. When the first locking structure 130 is in the first locked state, the stability of locking can be improved by the plurality of first locking blocks 132 abutting against the inner wall of the first hollow tube 110, so that the stem telescoping mechanism 10 can be stably in the adjusted height, thus improving the stability of the overall structure. When the first locking structure 130 is in the first movable state, the plurality of first locking blocks 132 all move to the first evading position, that is, the plurality of first locking blocks 132 all move to positions where they are spaced apart from the inner wall of the first hollow tube 110, so that the second hollow tube 120 can smoothly move in the first hollow tube 110.

In the embodiment of the present disclosure, the first locking structure 130 further includes a first fixed base 133. The first push rod 131 is movably arranged to the first fixed base 133. The first fixed base 133 is provided with a mounting slot. The first locking block 132 is movably arranged in the mounting slot. Specifically, the first fixed base 133 in the embodiment of the present disclosure is provided with a plurality of mounting slots. The plurality of mounting slots are annularly spaced apart, that is, the plurality of mounting slots are spaced apart in a circumferential direction of the first fixed base 133, so that the first locking blocks 132 can be mounted in the mounting slots and also the movements of the first locking blocks 132 can be restricted by the mounting slots, thus improving the overall stability of the structure.

Specifically, the first locking structure 130 in the embodiment of the present further includes a third resetting member 134. A resetting end of the third resetting member 134 abuts against the first push rod 131, so that the first push rod 131 can be reset under the action of the third resetting member 134. With such arrangements, when the overall height of the stem telescoping mechanism 10 needs to be adjusted, the first push rod 131 is pulled, so that the first locking block 132 evades the inner wall of the first hollow tube 110 with the fit of a driving surface and the push surface. When the second hollow tube 120 moves to a corresponding position in the first hollow tube 110, the user no longer operates the first locking structure 130, and the first push rod 131 is reset through the third resetting member 134, so that the first push rod 131 pushes the plurality of first locking blocks 132 to the first locked position. Specifically, the third resetting member 134 in the embodiment of the present disclosure is a reset spring. The first reset spring is fitted over least part of the first push rod 131.

Specifically, the first locking structure 130 in the embodiment of the present disclosure further includes a second fixed base 135. The second fixed base 135 is arranged to the first fixed base 133. The first fixed base 133 and the second fixed base 135 define an accommodating cavity. The first push rod 131 and the third resetting member 134 are both arranged in the accommodating cavity. The third resetting member 134 has an abutting end and a resetting end arranged oppositely. The abutting end abuts against an inner wall of the second fixed base 135. Specifically, the first push rod 131 is arranged through the second fixed base 135. The first fixed base 133 and the second fixed base 135 are arranged in a fitted manner. With the above arrangements, the compactness of the structure can be improved, and the stability of resetting can also be improved.

In the embodiment of the present disclosure, the first push rod 131 includes a main body 1311 and a driving portion 1312. The main body 1311 is a rod-like structure. The driving portion 1312 protrudes beyond the main body 1311. The driving portion 1312 is configured to abut against the first locking block 132 to push the first locking block 132 to move. The third resetting member 134 is fitted over the main body 1311. The resetting end of the third resetting member 134 is configured to abut against the driving portion 1312. Specifically, the resetting end abuts against an end of the driving portion 1312 in the embodiment of the present disclosure, so as to facilitate resetting. With such arrangements of the first push rod 131, the compactness of the structure can be improved, and the space layout can be optimized.

Specifically, the stem telescoping mechanism 10 in the embodiment of the present disclosure further includes a second driving member. The second driving member is connected to at least part of the first locking structure 130, so that the first locking structure 130 can be driven to move through the second driving member. One end of the second driving member is connected to at least part of the first locking structure 130, and the other end of the second driving member extends out of the first hollow tube 110. With such arrangements, the first locking structure 130 can be driven to move by pulling the second driving member, so that the second hollow tube 120 can move to any position in the first hollow tube 110, thus further improving the convenience of operation.

In the embodiment of the present disclosure, the stem telescoping mechanism 10 further includes an amplification assembly 150. One end of the amplification assembly 150 is connected to the second driving member, and the other end of the amplification assembly 150 is connected to at least part of the first locking structure 130, so that a force applied to the first locking structure 130 is amplified through the amplification assembly 150. With such arrangements, locking and evading operations on the first locking block 132 can be completed only by applying a small force to the second driving member, so that the first locking block 132 can move to the first locked position or the first evading position, thereby further facilitating the user's operations and improving the convenience of operation.

Specifically, the amplification assembly 150 in the embodiment of the present disclosure may include a first pulley 151, a second pulley 152, and a transmission rope 153. A wheel diameter of the second pulley 152 is in a preset ratio to a wheel diameter of the first pulley 151. The transmission rope 153 is wound on the first pulley 151 and the second pulley 152. One end of the transmission rope 153 is connected to the second driving member, and the other end of the transmission rope 153 is connected to at least part of the first locking structure 130, so that the first locking structure 130 can be pulled to move through the transmission rope 153. With such arrangements, the magnitude of the force applied to the second driving member can be amplified through the first pulley 151, the second pulley 152, and the transmission rope 153, thereby better amplifying the force to better facilitate the user to perform operations. The amplification assembly 150 in the embodiment of the present disclosure further includes a first cover 154 and a second cover 155. The first cover 154 is arranged on one side of the first pulley 151, and the second cover 155 is arranged on the other side of the first pulley 151. The amplification assembly 150 may also be a gear structure, and an effect of amplifying the force is achieved by setting an appropriate gear transmission ratio.

The stem telescoping mechanism 10 in the embodiment of the present disclosure further includes a limiting ring 136. The limiting ring 136 is fitted over outer sides of a plurality of locking blocks, so that movement ranges of the plurality of locking blocks are restricted by the limiting ring 136.

In the stem telescoping mechanism 10 according the embodiment of the present disclosure, the first locking structure 130 of the stem telescoping mechanism 10 may also be referred to as an expanding assembly. The first push rod 131 moves rightwards under the action of a first compressed spring. Since the first push rod 131 and the first locking block 132 have an inclined-surface fit, four first locking blocks 132 may be provided in the embodiment, and the first push rod 131 spreads out the four first locking blocks 132 in all directions to allow the four first locking blocks 132 to firmly abut against an inner wall of an outer pipe, so that the inner pipe can be locked at any part of the outer pipe, that is, a stepless telescopic adjustment. A pretightening force in the embodiment is provided by a fourth resetting member 163. Since the pretightening force is very large and is generally difficult to be released by hands, the operations are easy due to the amplification of the force by the amplification assembly 150. Specifically, the amplification assembly 150 may have a spool transmission, a sprocket transmission, a gear and rack transmission or a link transmission to amplify the force. The amplification assembly 150 in the embodiment is a spool transmission amplification structure. The second driving member is pulled by hands or in other manners to move leftwards, and the driving rope 140 may be wound step by step around the first pulley 151 and the second pulley 152. A ratio of a large wheel to a small wheel of the pulley is set as required. The driving rope 140 may be first wound on the large wheel of the first pulley 151, then wound on the small wheel of the first pulley 151, further wound on the large wheel of the second pulley 152, and finally wound on the small wheel of the second pulley 152 and tied to the first push rod 131. Thus, the large wheels may gradually amplify the force, so that the pretightening force of the first locking structure 130 can be released when the rope is pulled by hands only with a small force, and thus the length of the stem telescoping mechanism 10 can be easily adjusted.

Figure 6:
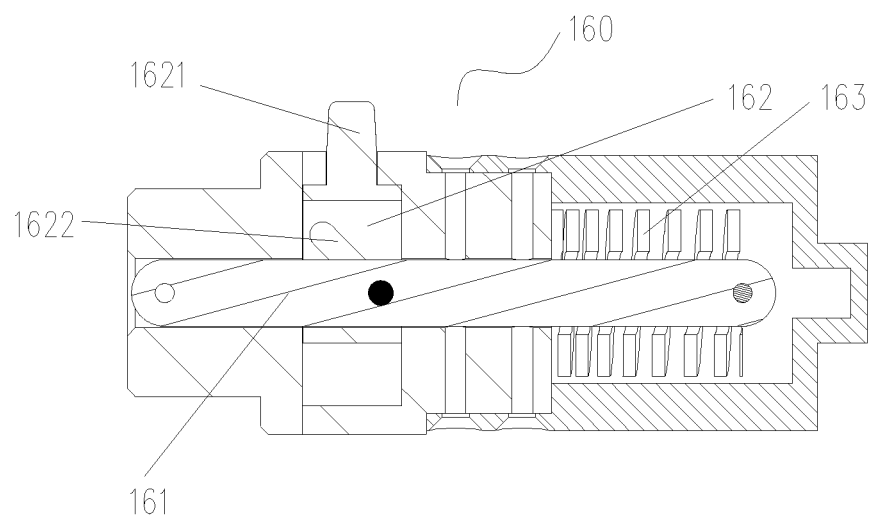
FIG. 6 is a schematic view of a second locking structure of a stem telescoping mechanism according to another embodiment of the present disclosure.
Figure 7:
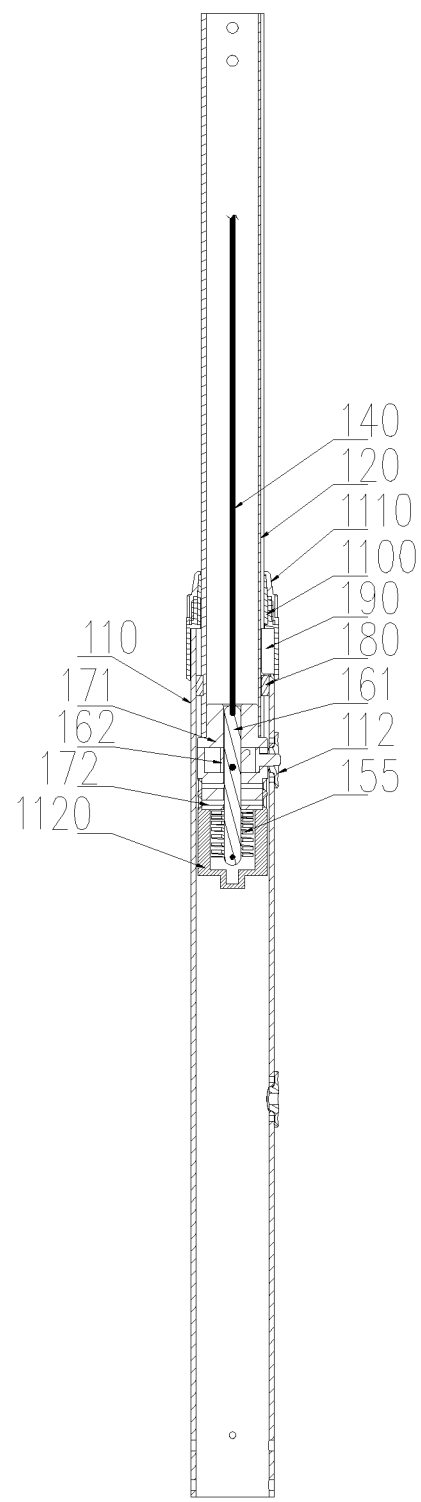
FIG. 7 is a sectional view of a stem telescoping mechanism according to another embodiment of the present disclosure.
Figure 8:
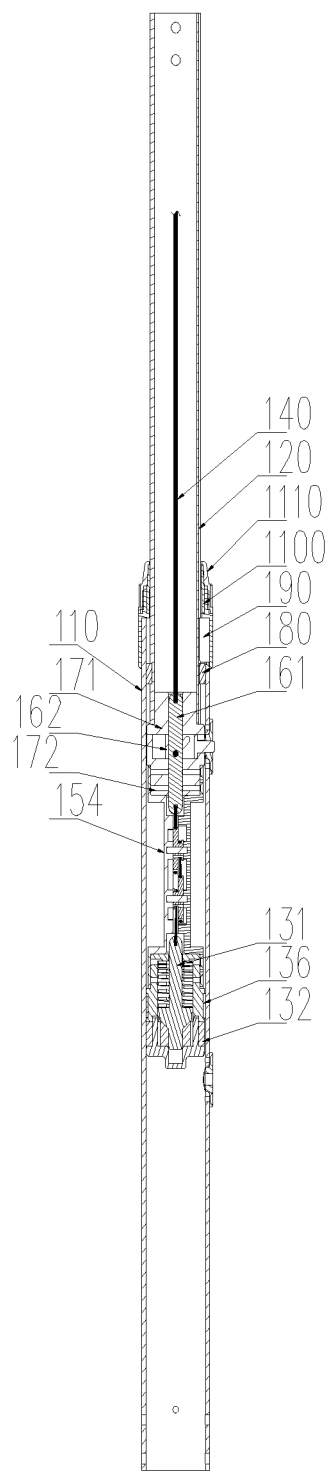
FIG. 8 is a schematic view of a stem telescoping mechanism according to another embodiment of the present disclosure.
Figure 9:
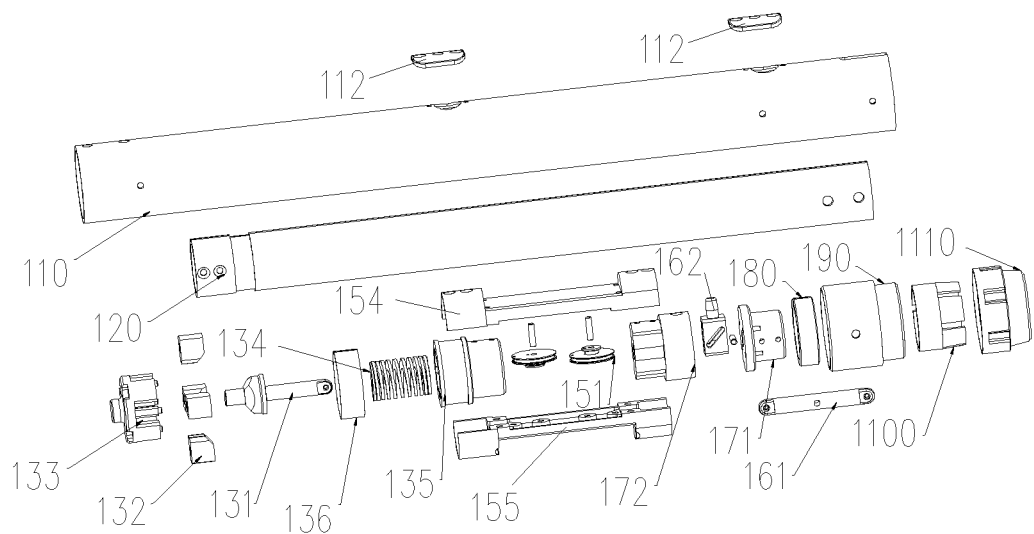
FIG. 9 is an exploded view of a stem telescoping mechanism according to another embodiment of the present disclosure.
Figure 10:
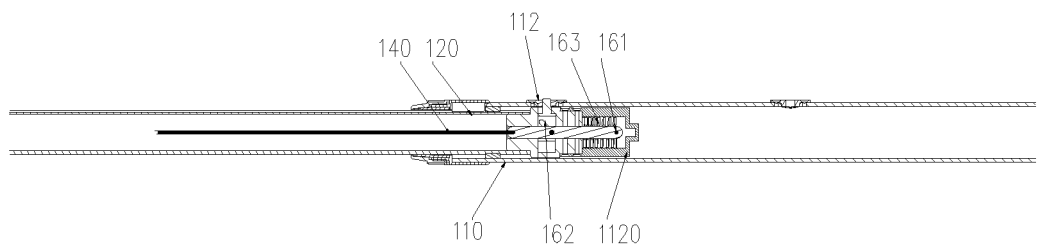
FIG. 10 is a sectional view of a stem telescoping mechanism according to another embodiment of the present disclosure.
Figure 11:
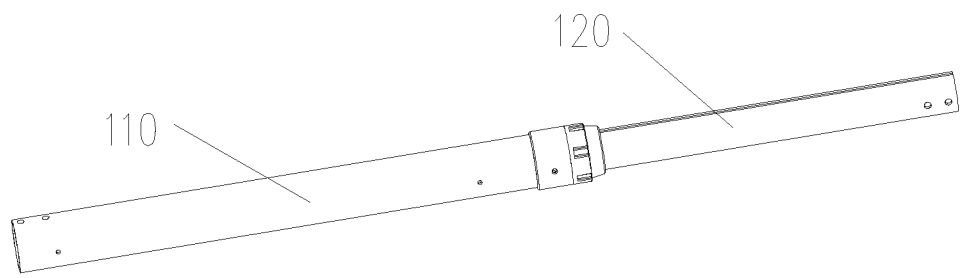
FIG. 11 is a schematic view of a first hollow tube and a second hollow tube of a stem telescoping mechanism according to another embodiment of the present disclosure.
Figure 12:
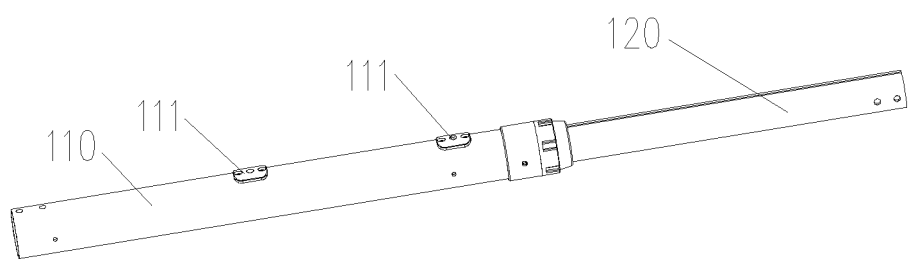
FIG. 12 is a schematic view of a first hollow tube having an engaging hole of a stem telescoping mechanism according to another embodiment of the present disclosure.
Figure 13:
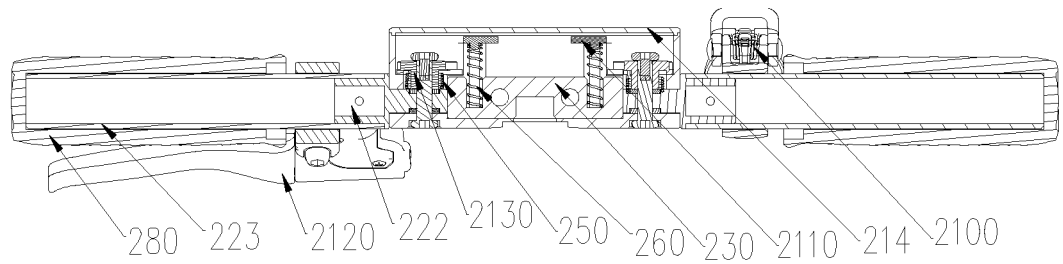
FIG. 13 is a sectional view of a handle folding structure according to another embodiment of the present disclosure.
Figure 14:
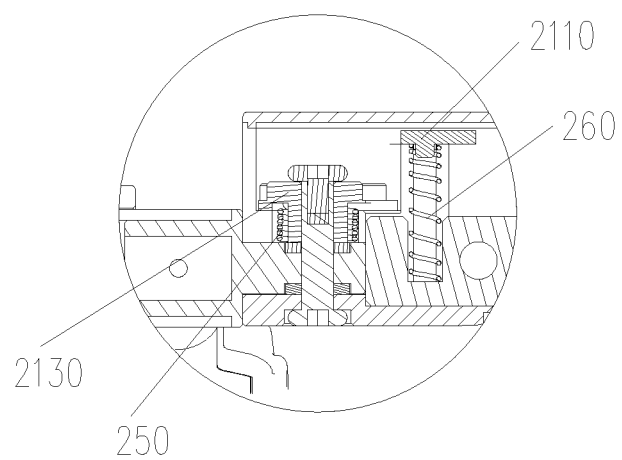
FIG. 14 is an enlarged view of a partial structure in FIG. 13.
Figure 15:
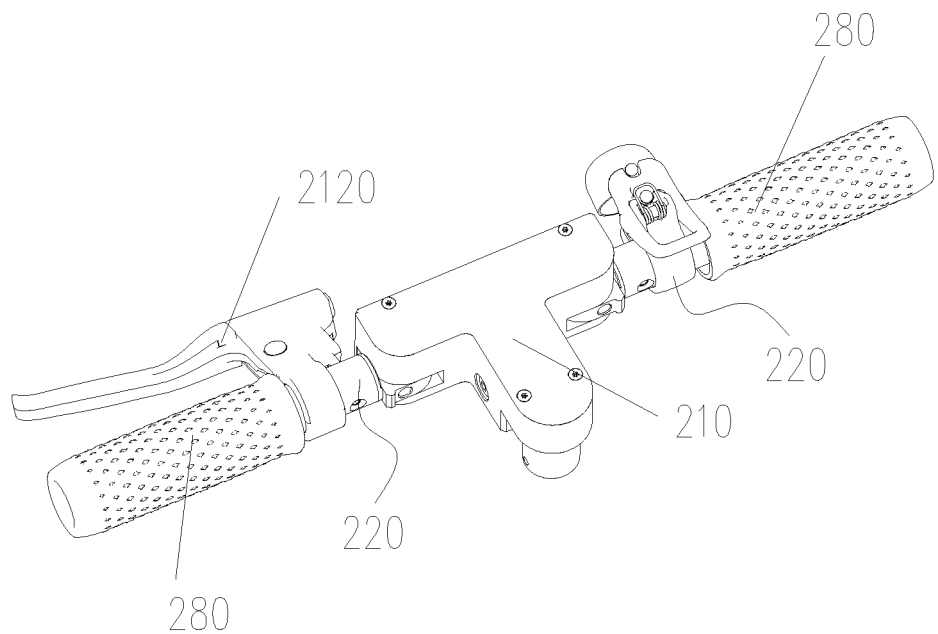
FIG. 15 is a schematic view of a handle folding structure according to another embodiment of the present disclosure, in which two handle assemblies of the handle folding structure are both at an unfolded position.
Figure 16:
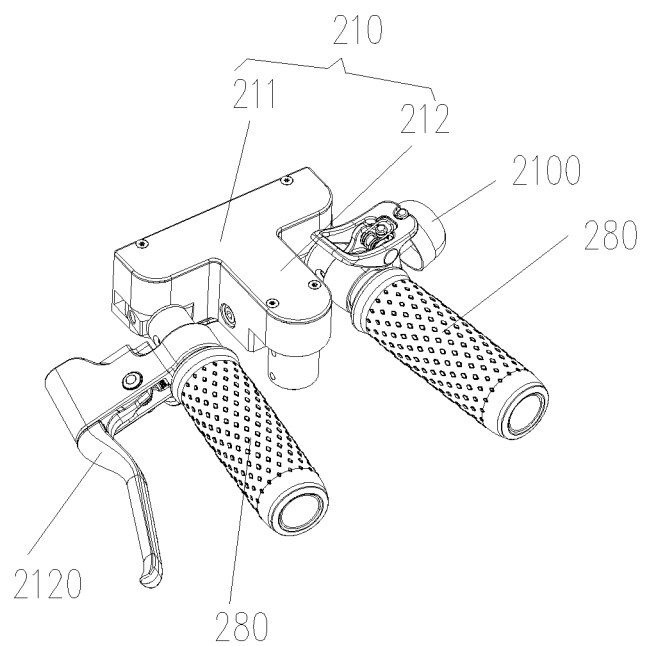
FIG. 16 is a schematic view of a handle folding structure according to another embodiment of the present disclosure, in which two handle assemblies of the handle folding structure are both at a folded position.
Figure 17:
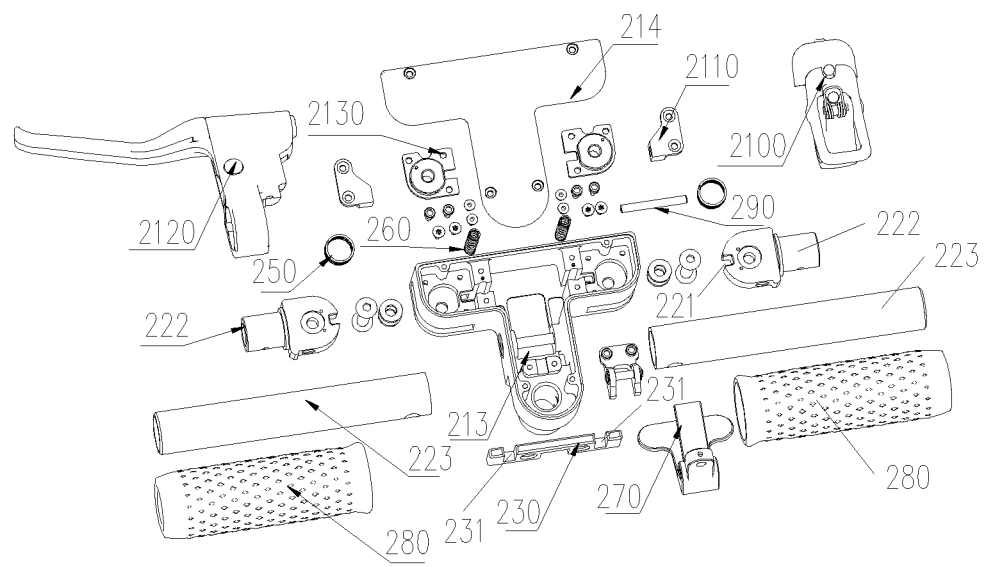
FIG. 17 is an exploded view of a handle folding structure according to another embodiment of the present disclosure.
Figure 18:
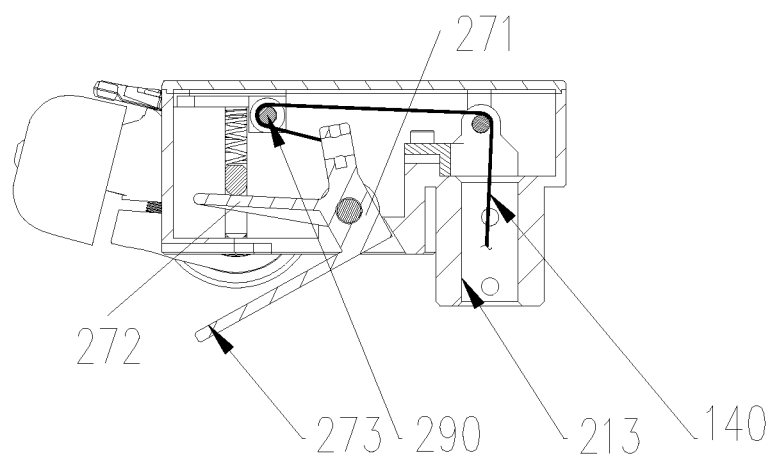
FIG. 18 is a sectional view of a handle folding structure according to another embodiment of the present disclosure from another perspective.
Figure 19:
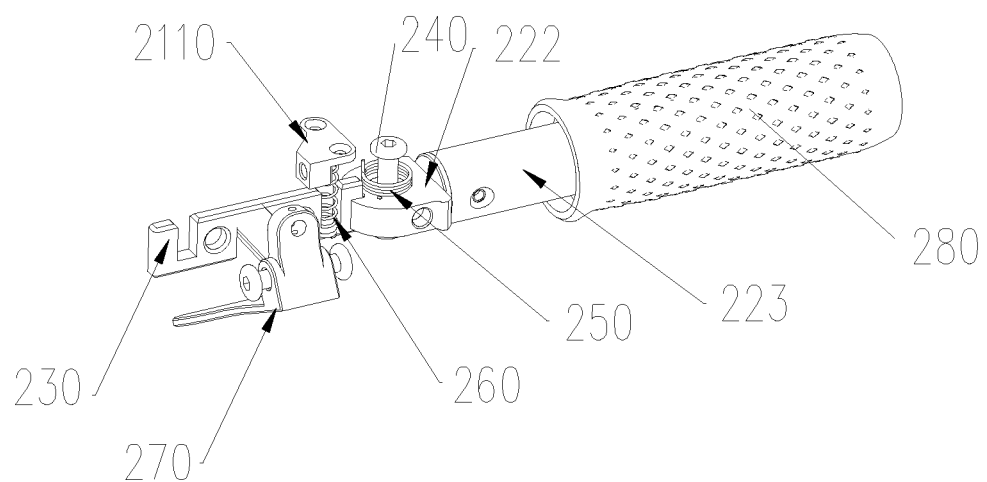
FIG. 19 is a partial schematic view of a handle folding structure according to another embodiment of the present disclosure.

Specifically, as illustrated in FIG. 6 and FIG. 7, a tube wall of the first hollow tube 110 in the embodiment of the present disclosure is provided with an engaging hole 111. A plurality of engaging holes may be provided. The plurality of engaging holes 111 are spaced apart. The locking mechanism further includes a second locking structure 160. The second locking structure 160 is connected to the second hollow tube 120. The second locking structure 160 is movably arranged in the inner cavity of the first hollow tube 110. The second locking structure 160 has a second locked state and a second movable state. When the second locking structure 160 is in the second locked state, at least part of the second locking structure 160 extends into the engaging hole 111 to restrict the movement of the second hollow tube 120. When the second locking structure 160 is in the second movable state, the second locking structure 160 evades the engaging hole 111, so that the second hollow tube 120 can move in the first hollow tube 110. The second locking structure 160 in the embodiment can be engaged only at a particular position where the engaging hole 111 is located, to achieve the second locked state. Specifically, the first hollow tube 110 in the embodiment includes an engaging block 112. The engaging hole 111 is formed in the engaging block 112.

Specifically, the second locking structure 160 in the embodiment of the present disclosure includes a second push rod 161 and a second locking block 162. The second push rod 161 is connected to the second locking block 162. The second locking block 162 is provided with a locking projection 1621. The second push rod 161 is configured to push the second locking block 162 to move to the second locked position or second evading position. When the second locking block 162 is at the second locked position, the locking projection 1621 is engaged in the engaging hole 111, so that the second locking structure 160 is in the second locked state. When the second locking block 162 is at the second evading position, the locking projection 1621 evades the engaging hole 111, so that the second locking structure 160 is in the second movable state. With such arrangements, the second locking block 162 can be pushed by the second push rod 161 to move stably, so that the second locking block 162 can stably move to the second locked position or second evading position.

In the embodiment of the present disclosure, the second push rod 161 is provided with a push projection, and the second locking block 162 is provided with a receiving slot 1622. The push projection is movably arranged in the receiving slot 1622 to drive the second locking block 162 to move to the second locked position or the second evading position. Specifically, the receiving slot 1622 is an inclined slot, so that a movement direction of the second push rod 161 is perpendicular to that of the second locking block 162, so that the second locking block 162 can be driven to move stably by the movement of the second push rod 161, thereby improving the stability of movements.

Specifically, the second locking structure 160 in the embodiment of the present disclosure further includes a fourth resetting member 163. A resetting end of the fourth resetting member 163 is connected to the second push rod 161, so that the fourth resetting member 163 resets the second locking block 162 through the second push rod 161. The fourth resetting member 163 in the embodiment of the present disclosure is a reset spring. The reset spring is fitted over the second push rod 161. Specifically, the second locking block 162 can be reset to the second locked position through the resetting of the fourth resetting member 163 in the embodiment of the present disclosure, so as to improve the stability of locking.

In the embodiment of the present disclosure, the second locking structure 160 further includes a Teflon ring 180, a tube socket 190, a clasp ring 1100, an end cover 1110, a tail cover 1120, a first pin boss 171, and a second pin boss 172. The tail cover 1120 is provided with an accommodating cavity. The fourth resetting member 163 is arranged in the accommodating cavity. The first pin boss 171 is fixed to the inner tube. The second pin boss 172 is fixed to the first pin boss 171. The tail cover 1120 is fixed to the second pin boss 172. The second push rod 161 includes a main body and a push projection. The push projection protrudes beyond the main body. The push projection may slide in the receiving slot 1622. When the main body moves leftwards, the main body may drive the push projection to move leftwards together, so that the second locking block 162 moves downwards. The Teflon ring 180 is arranged to the first pin boss 171. The tube socket 190 is arranged on one side of the end cover 1110, and the tail cover 1120 is arranged on the other side of the end cover 1110.

In the technical solution provided in the embodiment of the present disclosure, when the second driving member is driven to move leftwards by being pulled with hands or in any other manners, the driving rope 140 pulls the second push rod 161 to move leftwards together. In this case, the second locking block 162 moves downwards, the second locking block 162 is separated from the engaging hole 111, and the telescoping limiting is removed. The inner tube can telescopically move in the outer tube. When the second locking block 162 moves from one engaging hole 111 to another engaging hole 111, the second push rod 161 moves rightwards under the action of the compressed ring, so that the second locking block 162 moves upwards and enters the engaging hole 111, and the inner tube is firmly locked, thereby completing a telescoping process. At the same time, the locking projection 1621 and the engaging hole 111 have a taper fit, which eliminates the shaking between the inner tube and the outer tube during telescoping. The second locking structure 160 in the embodiment of the present disclosure has a stepped adjustment mode. The number of steps of the stepped adjustment may be set arbitrarily based on actual usages.

As illustrated in FIG. 8 to FIG. 12, in another embodiment of the present disclosure, the stem telescoping mechanism 10 includes the first locking structure 130, the second locking structure 160, and the second driving member. The first locking structure 130 and the second locking structure 160 are both connected to the second driving member, so that the first locking structure 130 and the second locking structure 160 can be driven to move by the second driving member. Specifically, the second push rod 161 of the second locking structure 160 is connected to the amplification assembly 150 of the first locking structure 130, so that the first locking structure 130 and the second locking structure 160 can be driven to move simultaneously by the second driving member. With such arrangements, the first locking structure 130 and the second locking structure 160 can be conveniently driven to move simultaneously by the second driving member, which achieves a one-button triggering and easy operations, so as to better adjust the overall height of the stem telescoping mechanism 10 and further improve the usage convenience of the user.

Specifically, the second driving member in the embodiment of the present disclosure may be the driving rope 140. Locked states of the first locking structure 130 and the second locking structure 160 can be easily controlled by pulling the driving rope 140, so as to facilitate the telescopic operation on the stem telescoping mechanism 10, so that the overall length of the stem telescoping mechanism 10 can be adjusted arbitrarily. The driving member may also be a rigid member, such as a polished rod structure.

In the embodiment of the present disclosure, the driving mechanism includes the driving block 270 and the driving rope 140. The driving block 270 is drivingly connected to the first limiting member 230, and the driving rope 140 is connected to the driving block 270. The second locking structure 160 includes the second push rod 161 and the second locking block 162. The second push rod 161 is connected to the driving rope 140. The second push rod 161 is connected to the second locking block 162. The second locking block 162 is provided with the locking projection 1621. The second push rod 161 is configured to push the second locking block 162 to move to the second locked position or the second evading position. When the second locking block 162 is at the second locked position, the locking projection 1621 is engaged in the engaging hole 111, so that the second locking structure 160 is in the second locked state. When the second locking block 162 is at the second evading position, the locking projection 1621 evades the engaging hole 111, so that the second locking structure 160 is in the second movable state.

Specifically, the handle folding mechanism 20 in the embodiment of the present disclosure further includes a mounting housing 210. Two handle assemblies 220 are provided. The two handle assemblies 220 are arranged to two opposite ends of the mounting housing 210. The first limiting member 230 is movably arranged to the mounting housing 210. The first limiting member 230 is arranged between the two handle assemblies 220. When the first limiting member 230 is at the first limiting position, at least part of the first limiting member 230 is engaged with the two handle assemblies 220 to restrict movements of the two handle assemblies 220. When the first limiting member 230 is at the first evading position, the first limiting member 230 evades the two handle assemblies 220 so that the two handle assemblies 220 are movably arranged to the mounting housing 210.

In the handle folding mechanism 20 provided in the embodiment of the present disclosure, the movements of the two handle assemblies 220 can be controlled simultaneously by controlling the movement of the first limiting member 230. Specifically, in the embodiment, by moving the first limiting member 230 from the first limiting position to the first evading position, the two handle assemblies 220 can both be rotated from an unfolded position to a folded position, so as to easily fold the two handle assemblies 220 to reduce the space occupied by the handle folding mechanism 20. Moreover, the two handle assemblies 220 can be synchronously controlled only by operating the first limiting member 230 in the embodiment, which facilitates the operation and use of the staff and improves the convenience of use.

Specifically, the handle assembly 220 in the embodiment is provided with a second engaging slot 221. The second engaging slot 221 of one handle assembly 220 and the second engaging slot 221 of the other handle assembly 220 are arranged oppositely. When the first limiting member 230 is at the first limiting position, one end of the first limiting member 230 is engaged in the second engaging slot 221 of one handle assembly 220, and the other end of the first limiting member 230 is engaged in the second engaging slot 221 of the other handle assembly 220. Specifically, the first limiting member 230 in the embodiment is a strip structure. The strip structure has two ends arranged oppositely. One end of the strip structure is engaged in the second engaging slot 221 of one handle assembly 220, and the other end of the strip structure is engaged in the second engaging slot 221 of the other handle assembly 220. The two handle assemblies 220 are limited through the fit between the first limiting member 230 and the second engaging slots 221 of the two handle assemblies 220, so as to improve the stability of limiting, so that the two handle assemblies 220 can be stable in the unfolded position, thus improving the safety of use.

Specifically, the second engaging slot 221 in the embodiment is an open slot. The first limiting member 230 is movably arranged in the open slot, so as to facilitate the first limiting member 230 to move to the first limiting position or the first evading position.

As illustrated in FIG. 13 to FIG. 19, in the embodiment, the handle assembly 220 includes a handlebar seat 222 and a handlebar 223. At least part of the first limiting member 230 is engaged with the handlebar seat 222. The handlebar seat 222 is rotatably arranged to the mounting housing 210. The handlebar 223 is arranged to the handlebar seat 222, so that the handlebar seat 222 drives the handlebar 223 to rotate. Specifically, the second engaging slot 221 is formed in the handlebar seat 222. The handlebar seat 222 includes an engaging portion and a connecting portion. The engaging portion and the connecting portion are connected. The connecting portion is configured to be connected to the handlebar 223. The connecting portion may be a connecting column or a connecting cylinder. The handlebar 223 is fitted over the connecting column or the connecting cylinder. An end of the engaging portion away from the connecting portion is provided with the second engaging slot 221, so that the first limiting member 230 can be engaged in the second engaging slot 221.

In the embodiment of the present disclosure, the handle folding mechanism 20 further includes a first rotating shaft 240 and a torsion spring 250. The first rotating shaft 240 is arranged to the mounting housing 210. The first rotating shaft 240 is arranged through at least part of the handle assembly 220, so that the handle assembly 220 can rotate around the first rotating shaft 240. Specifically, the first rotating shaft 240 is arranged through the handlebar seat 222, so that the handlebar seat 222 can rotate around the first rotating shaft 240. The torsion spring 250 is fitted over the first rotating shaft 240. One end of the torsion spring 250 is connected to the mounting housing 210, and the other end of the torsion spring 250 is connected to the handle assembly 220, so that the handle assembly 220 can be driven to move under the torsion of the torsion spring 250. With such arrangements, the handle assembly 220 can move to the unfolded position or the folded position through the torsion of the torsion spring 250. Specifically, the torsion spring 250 in the embodiment is configured to drive the handle assembly 220 to move from the unfolded position to the folded position, so as to fold the handle assembly 220, which improves the convenience of operation.

In the embodiment of the present disclosure, the handle folding mechanism 20 further includes a fifth resetting member 260. The fifth resetting member 260 is arranged to the mounting housing 210. A resetting end of the fifth resetting member 260 is configured to be connected to the first limiting member 230, so that the first limiting member 230 can be reset under the action of the fifth resetting member 260. Specifically, in the embodiment of the present disclosure, the fifth resetting member 260 is configured to reset the first limiting member 230 from the first evading position to the first limiting position. Specifically, when the first limiting member 230 is at the first limiting position, the fifth resetting member 260 is not affected by an external force. When the first limiting member 230 is at the first evading position, the fifth resetting member 260 is affected by an external force. In this way, the first limiting member 230 can be reset from the first evading position to the first limiting position under the force of the fifth resetting member 260, so as to limit the two handle assemblies 220, so that the two handle assemblies 220 can be stable in the unfolded position, thereby improving the stability and safety of use.

Specifically, the first limiting member 230 in the embodiment is provided with a second mounting slot 231, and the fifth resetting member 260 may be a reset elastic member. Specifically, the fifth resetting member 260 in the embodiment may be a reset spring. At least part of the reset spring is arranged in the second mounting slot 231. The reset spring abuts against a bottom of the second mounting slot 231 to reset the first limiting member 230. With such arrangements, the first limiting member 230 can be stably reset with the reset spring abutting against the second mounting slot 231 in the first limiting member 230, so as to better allow the first limiting member 230 to move from the first evading position to the first limiting position.

In the embodiment of the present disclosure, two second mounting slots 231 are provided. The two second mounting slots 231 are spaced apart. Two reset springs are provided. The two reset springs and the two second mounting slots 231 are arranged in a one-to-one correspondence manner. At least part of each reset spring is arranged in the corresponding second mounting slot 231. With such arrangements, the stability of resetting can be improved, so that the first limiting member 230 can be stably reset from the first evading position to the first limiting position.

In order to further improve the convenience of operation, the driving end of the driving block 270 in the embodiment is drivingly connected to the first limiting member 230, so that the driving block 270 can drive the two handle assemblies 220 to move through the first limiting member 230. With such arrangements, the user only needs to operate the driving block 270, which can further improve the convenience of operation and use.

Specifically, the driving block 270 is rotatably arranged to the mounting housing 210, so that the first limiting member 230 can be driven to move by the driving end of the driving block 270. Specifically, the driving end of the driving block 270 may be connected with the first limiting member 230, or the driving end of the driving block 270 may abut against the first limiting member 230. In order to guide the movement of the first limiting member 230, the mounting housing 210 may be provided with a guide slot 315, and the first limiting member 230 is movably arranged in the guide slot 315, so that the first limiting member 230 can move to the first limiting position or the first evading position, thus further improving the reliability of movement.

In the embodiment of the present disclosure, the driving block 270 includes a driving body 271, a first driving plate 272, and a second driving plate 273. The first driving plate 272 and the second driving plate 273 are both arranged to the driving body 271. The first driving plate 272 and the second driving plate 273 are spaced apart. The first driving plate 272 is configured to be drivingly connected to the first limiting member 230. The first driving plate 272 serves as a driving end. The first driving plate 272 is arranged in a mounting cavity of the mounting housing 210. The second driving plate 273 is arranged outside the mounting cavity. Specifically, the user can operate the first limiting member 230 by operating the second driving plate 273. When the user pulls the second driving plate 273, the first driving plate 272 may simultaneously drive the first limiting member 230 to move.

Specifically, the mounting housing 210 in the embodiment includes a first housing portion 211 and a second housing portion 212. The second housing portion 212 is connected to the first housing portion 211. The first housing portion 211 and the second housing portion 212 are both a stripe structure. The first housing portion 211 and the second housing portion 212 form a T-shaped structure. When the handle assembly 220 is at the unfolded position, the handle assembly 220 extends along an extension direction of the first housing portion 211. When the handle assembly 220 is at the folded position, the handle assembly 220 extends along an extension direction of the second housing portion 212. Specifically, in the embodiment of the present disclosure, the second housing portion 212 is arranged in the middle of the first housing portion 211, the first housing portion 211 and the second housing portion 212 are arranged perpendicular to each other, the first housing portion 211 and the second housing portion 212 both extend in a horizontal direction, and the rotating shaft 350 of the handle assembly 220 extends in a vertical direction.

With the handle folding mechanism 20 provided in the embodiment of the present disclosure, when the user pulls the driving block 270 upwards, the driving block 270 may jack up the first limiting member 230, and the first limiting member 230 may be separated from the second engaging slot 221 of the handlebar seat 222, to be at the evading position. The handlebar seat 222 is no longer limited by the first limiting member 230, and hence is driven to rotate under the action of the torsion spring 250, thus achieving an effect of automatic folding. When the user pulls the handlebar back to the unfolded position, the first limiting member 230 may automatically enter the second engaging slot 221 of the handlebar seat 222 under the action of the fifth resetting member 260, so that the handlebar seat 222 can be firmly locked by the first limiting member 230, and thus the handle assembly 220 is stable at the unfolded position, thereby improving the stability of riding, and enhancing the use stability of the user.

Figure 20:
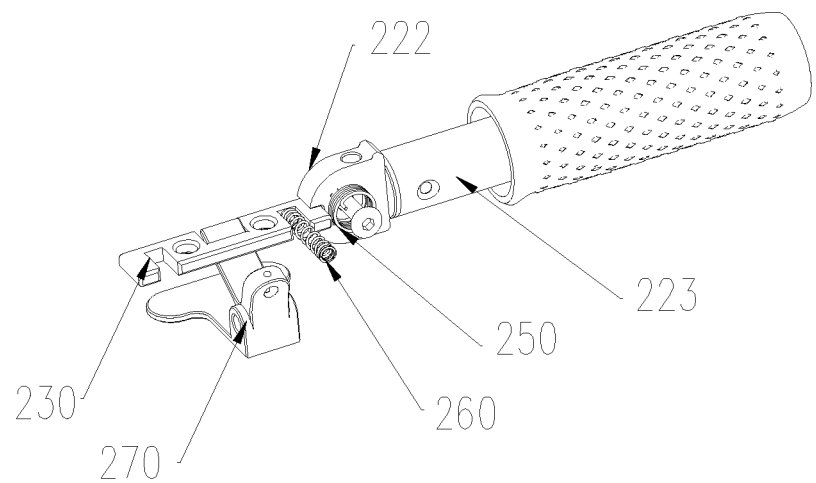
FIG. 20 is a partial schematic view of a handle folding structure according to another embodiment of the present disclosure.
Figure 21:
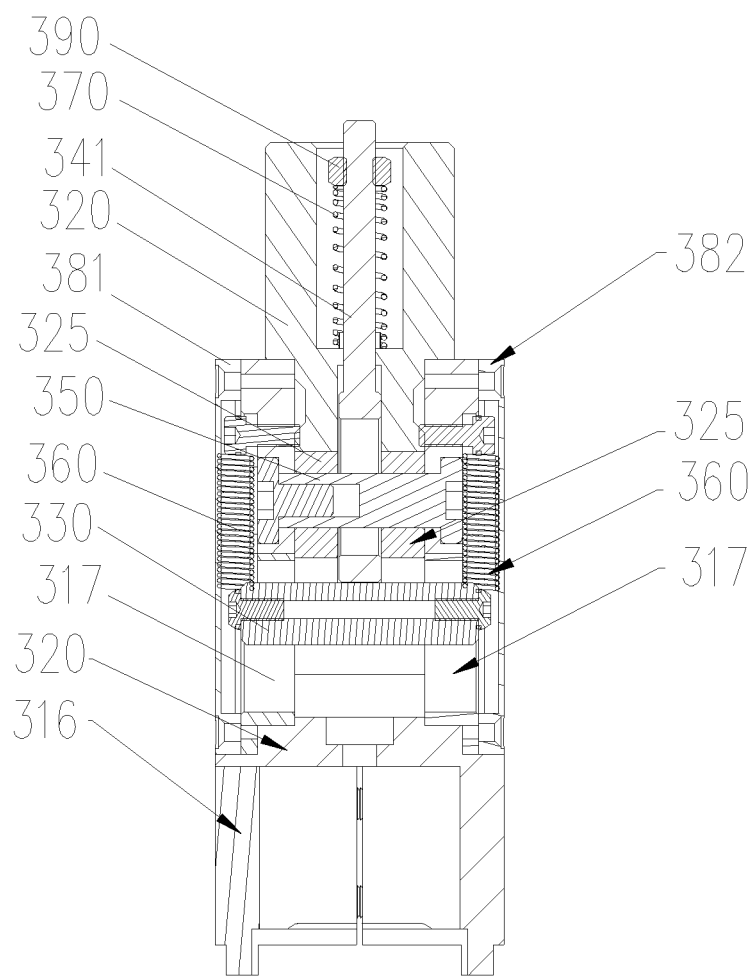
FIG. 21 is a schematic view of a stem folding mechanism according to an embodiment of the present disclosure.
Figure 22:
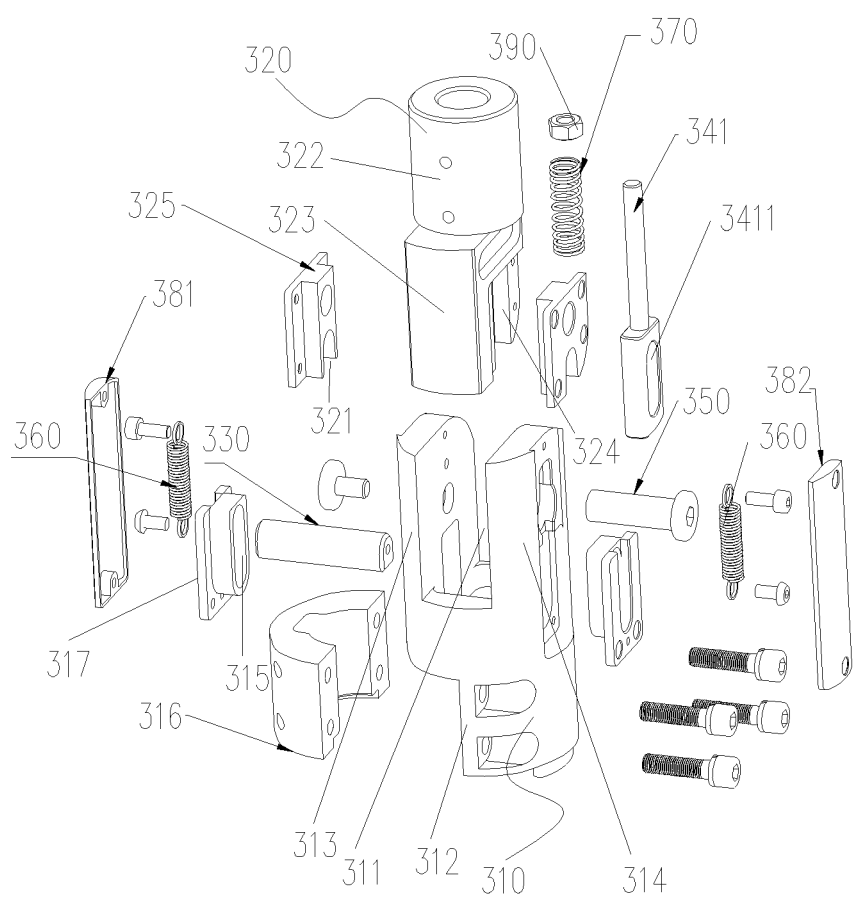
FIG. 22 is an exploded view of a stem folding mechanism according to an embodiment of the present disclosure.
Figure 23:
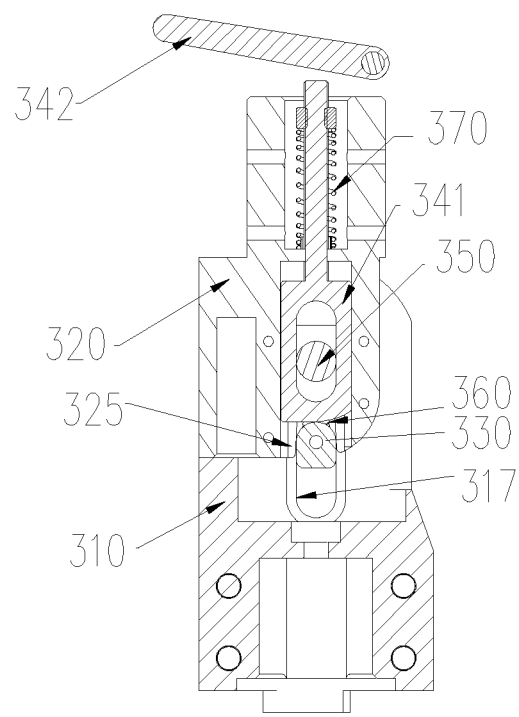
FIG. 23 is a sectional view of a stem folding mechanism according to an embodiment of the present disclosure.
Figure 24:
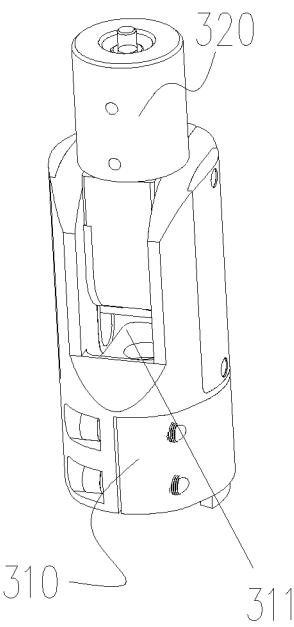
FIG. 24 is a schematic view of a stem folding mechanism according to an embodiment of the present disclosure, in which a second folding seat is in an unfolded state.
Figure 25:
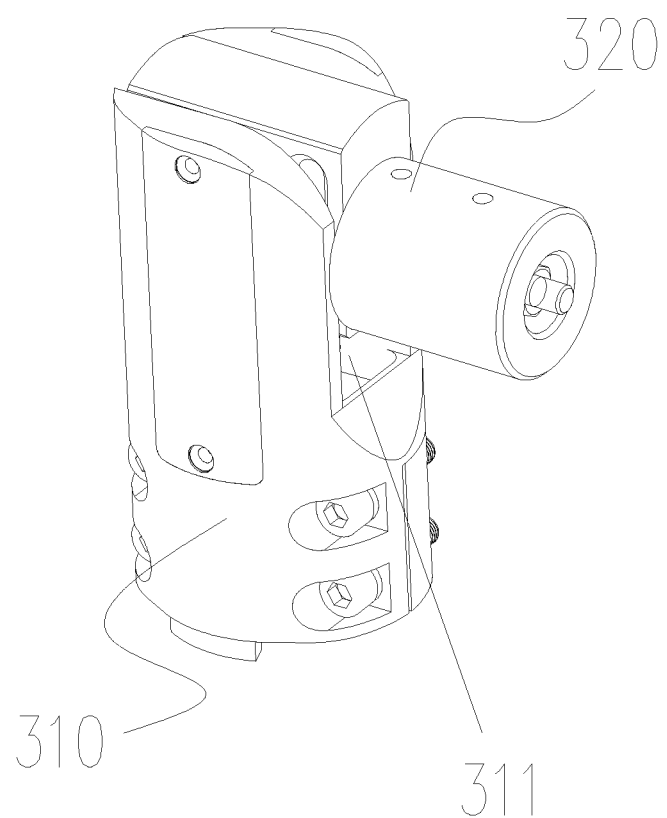
FIG. 25 is a schematic view of a stem folding mechanism according to an embodiment of the present disclosure, in which a second folding seat is in a folded state.
Figure 26:
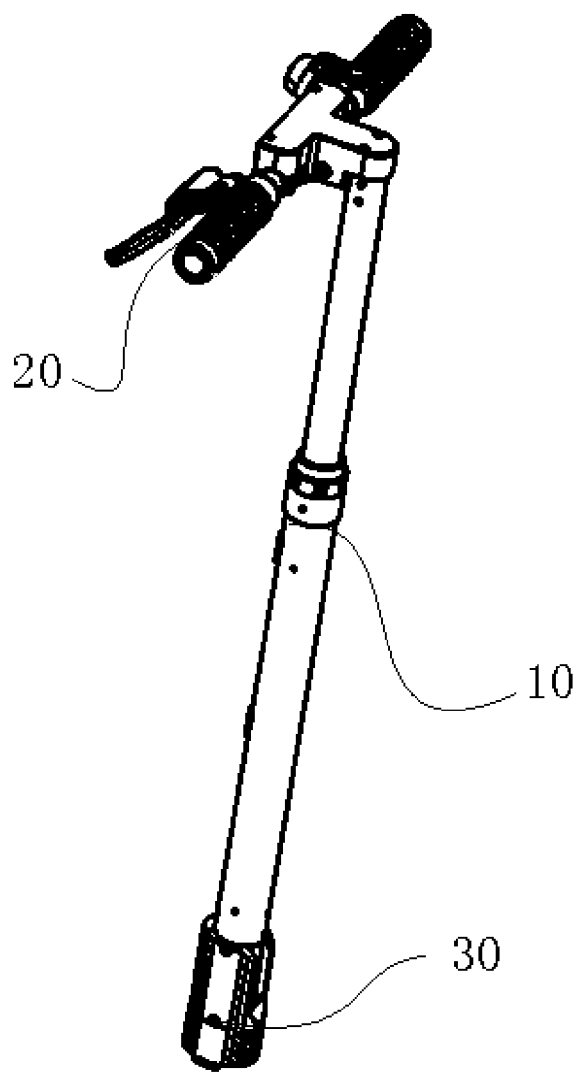
FIG. 26 is a schematic view of an electric vehicle according to an embodiment of the present disclosure.
Figure 27:
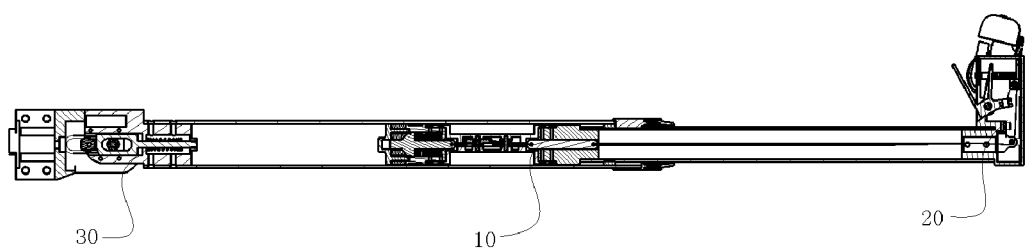
FIG. 27 is a sectional view of an electric vehicle in an unfolded state according to an embodiment of the present disclosure.
Figure 28:
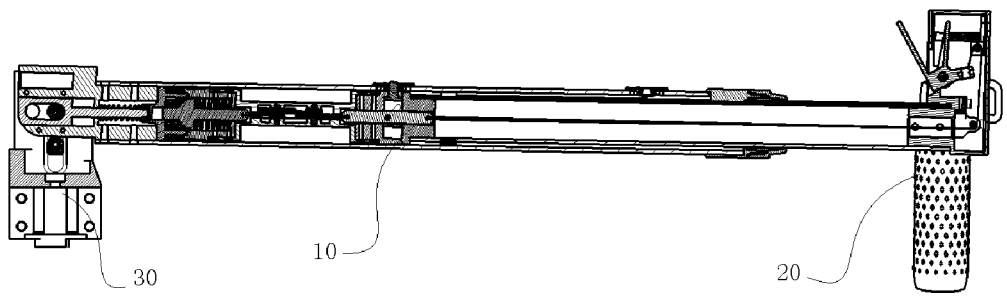
FIG. 28 is a sectional view of an electric vehicle in a folded state according to an embodiment of the present disclosure.
Figure 29:
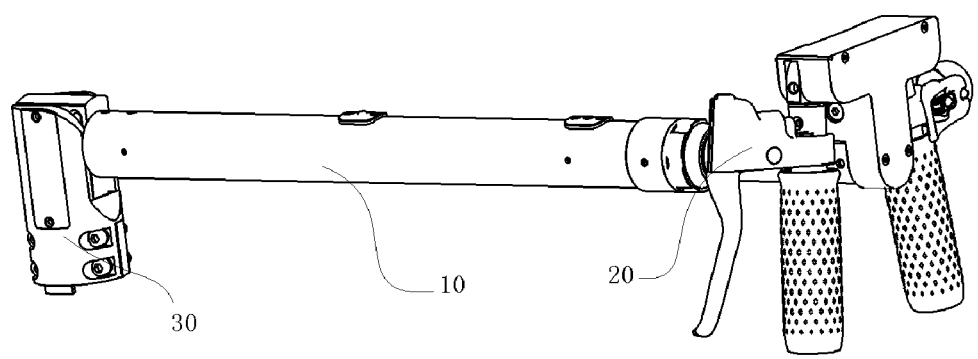
FIG. 29 is a schematic view of an electric vehicle in a folded state according to an embodiment of the present disclosure.
Figure 30:
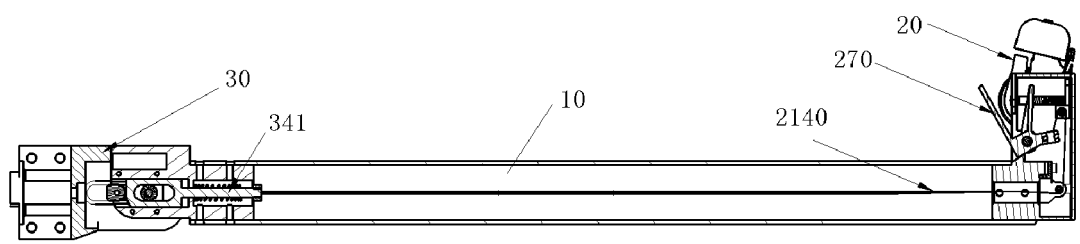
FIG. 30 is a schematic view illustrating synchronous folding of a stem folding mechanism and a handle folding mechanism of an electric vehicle according to an embodiment of the present disclosure.
Figure 31:
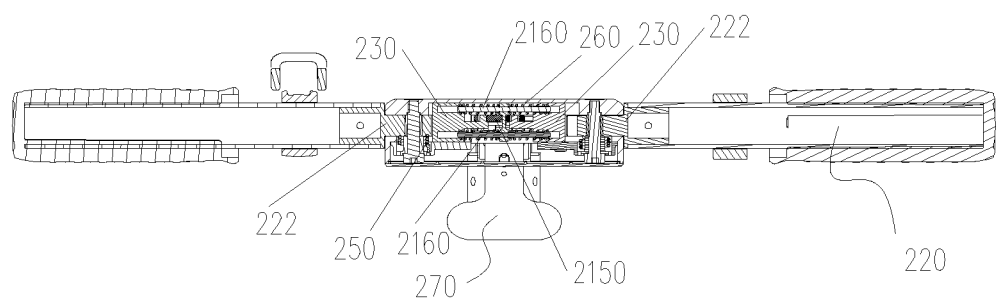
FIG. 31 is a sectional view of a handle folding structure having two first limiting members according to an embodiment of the present disclosure.
Figure 32:
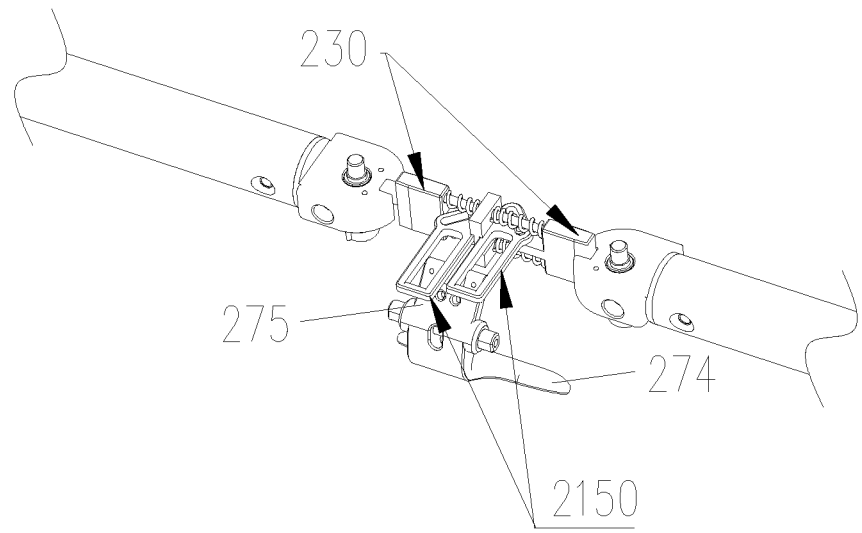
FIG. 32 is a schematic view of a handle folding structure having two first limiting members according to an embodiment of the present disclosure.
Figure 33:
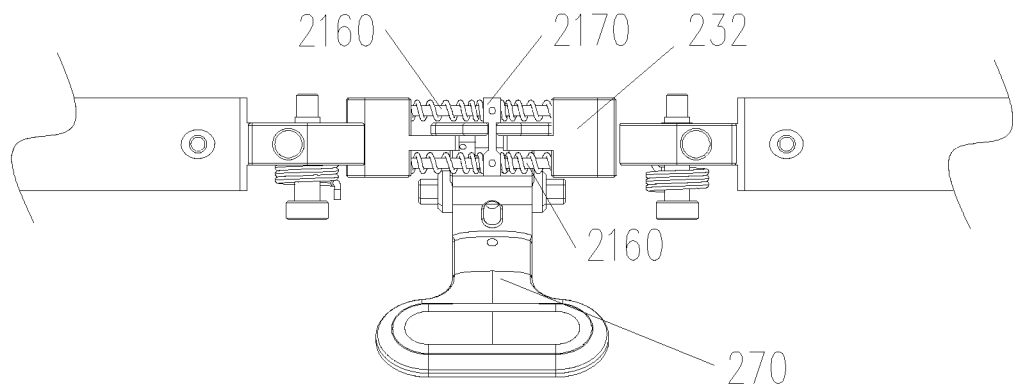
FIG. 33 is a partial schematic view of a handle folding structure having two first limiting members according to an embodiment of the present disclosure.
Figure 34:
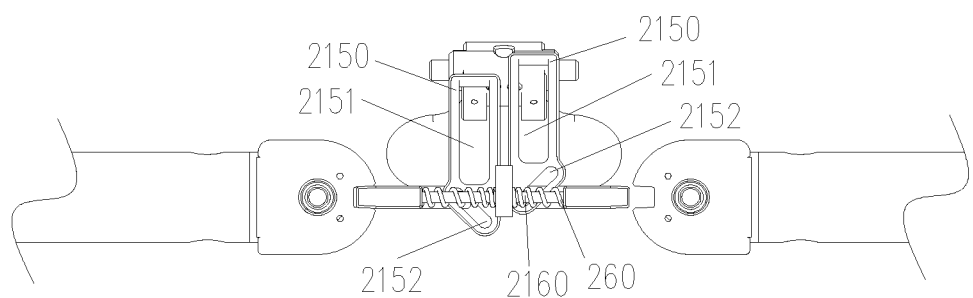
FIG. 34 is a schematic view of a sliding block of a handle folding structure having two first limiting members according to an embodiment of the present disclosure.
Figure 35:
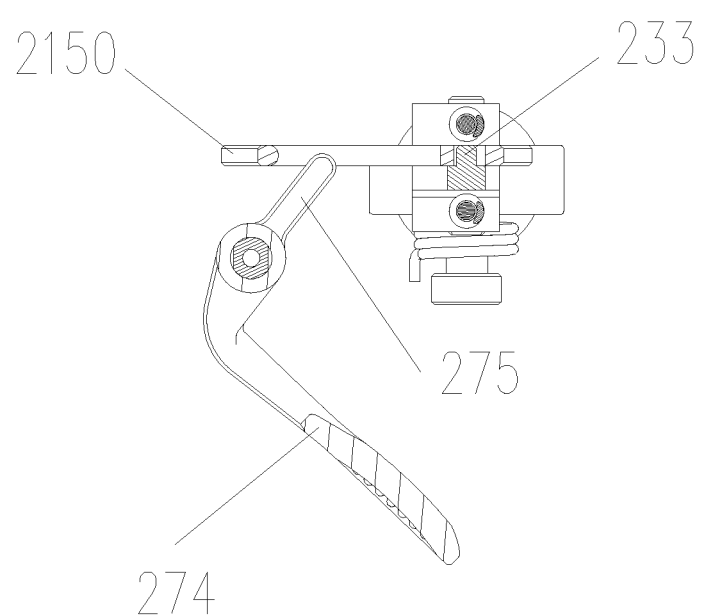
FIG. 35 is a schematic view of a driving member of a handle folding structure having two first limiting members according to an embodiment of the present disclosure.

As illustrated in FIG. 20, in another embodiment of the present disclosure, the mounting housing 210 includes the first housing portion 211 and the second housing portion 212. The second housing portion 212 is connected to the first housing portion 211. The first housing portion 211 and the second housing portion 212 are both a stripe structure. The first housing portion 211 and the second housing portion 212 form a T-shaped structure. When the handle assembly 220 is at the unfolded position, the handle assembly 220 extends along an extension direction of the first housing portion 211. When the handle assembly 220 is at the folded position, the handle assembly 220 is arranged perpendicular to the mounting housing 210. Specifically, in the embodiment of the present disclosure, the second housing portion 212 is arranged in the middle of the first housing portion 211, the first housing portion 211 and the second housing portion 212 are arranged perpendicular to each other, the first housing portion 211 and the second housing portion 212 both extend in a horizontal direction, and the rotating shaft of the handle assembly 220 extends in the same direction as the second housing portion 212.

The rotation direction of the handle assembly 220 in this embodiment is different from that of the handle assembly 220 in the previous embodiment. The rotating shaft of the handle assembly 220 in this embodiment is perpendicular to that of the handle assembly 220 in the previous embodiment.

In the above embodiments, the first housing portion 211 has two ends arranged oppositely. The two handle assemblies 220 are arranged on two opposite ends of the first housing portion 211, respectively. The first housing portion 211 is provided with two accommodating slots. The two accommodating slots are arranged oppositely in the two ends of the first housing portion 211. The handlebar seat 222 of one handle assembly 220 is rotatably arranged in one accommodating slot, and the handlebar seat 222 of the other handle assembly 220 is rotatably arranged in the other accommodating slot. With such arrangements, the compactness of the structure is improved, the space layout of the overall structure is optimized, and the aesthetics is also improved.

The handle folding mechanism 20 in the above embodiments may be used in the scooter and foldable handlebars of vehicles other than the scooter. Moreover, the handle folding mechanism 20 in the above embodiments can achieve the one-button triggering and unlocking, so that the two handle assemblies 220 can be automatically folded simultaneously. The handle folding mechanism 20 in the above embodiments can be combined with the telescoping and the folding of the stem of the scooter to realize a three-linkage one-button triggering, so as to further improve the convenience of operation.

In the above embodiments, the mounting housing 210 includes a mounting bottom shell 213 and a mounting cover 214. The mounting bottom shell 213 defines a mounting cavity. The mounting cover 214 covers the mounting bottom shell 213. In the above two embodiments, the handle folding mechanism 20 further includes a handlebar grip 280, a second rotating shaft 290, a bell 2100, a compressed spring cap 2110, a break lever 2120, a torsion spring cap 2130, and a driving rope 140. The handlebar grip 280 is fitted over the handlebar 223. The handlebar grip 280 may be generally made of a flexible material. The user may hold the handlebar grip 280 so as to improve the comfort of riding. At least part of the driving rope 140 in the embodiments is wound on the second rotating shaft 290, and the driving rope 140 is connected to the driving body 271 of the driving block 270, so that when the driving block 270 rotates relative to the mounting housing 210, the driving rope 140 is driven to move by the driving block 270, and the stem telescoping mechanism 10 and/or the stem folding mechanism 30 are/is driven by the driving rope 140 to move, so as to perform multiple operations via one button, thus further improving the convenience of operation. The bell 2100 is arranged on the handlebar 223. The compressed spring cap 2110 is arranged on the reset spring. The break lever 2120 is arranged to the handlebar 223. The torsion spring cap 2130 is arranged on the torsion spring 250.

As illustrated in FIG. 31 to FIG. 35, in an embodiment of the present disclosure, two first limiting members 230 are provided. The two first limiting members 230 are both movably arranged. The two first limiting members 230 and the two handle assemblies 220 are arranged in a one-to-one correspondence manner. Each first limiting member 230 is configured to limit the corresponding handle assembly 220. With such arrangements, the driving block 270 drives the two first limiting members 230 to enable the two first limiting members 230 to move to the first evading position or the first limiting position, so that the two handle assemblies 220 can be limited or evaded respectively for better folding or unfolding.

Specifically, the first limiting member 230 includes a limiting main body 232 and a limiting projection 233. The limiting projection 233 is arranged on the limiting main body 232. The handle folding structure 20 includes a guide post 2160. The guide post 2160 is fixed. The guide post 2160 is arranged in a guide hole of the limiting main body 232. The limiting main body 232 may move along an extension direction of the guide post 2160, so as to enable the first limiting member 230 to move to the first limiting position or the first evading position. An extension direction of the limiting projection 233 is perpendicular to that of the guide post 2160. The fifth resetting member 260 is fitted over the guide post 2160. The limiting main body 232 is a T-shaped structure. The limiting projection 233 is arranged to a projection portion of the limiting main body 232. Two guide posts 2160 are provided. The two guide posts 2160 are arranged on two sides of the limiting main body 232. The two guide posts 2160 are arranged in parallel. The projection portion of the limiting main body 232 is located between the two guide posts 2160. Correspondingly, the limiting main body 232 is provided with two guide holes. The two guide holes are spaced apart and arranged in parallel. The fifth resetting member 260 is fitted over each of the two guide posts 2160. The fifth resetting member 260 herein is a spring.

The handle folding structure 20 in the embodiment further includes a sliding block 2150 and a fixed block 2170. The fixed block 2170 is fixed. The fixed block 2170 is provided with a limiting hole. Two sliding blocks 2150 are provided. The fixed block 2170 is located between the two sliding blocks 2150. The guide post 2160 passes through the limiting hole. Two ends of the guide post 2160 are both provided with the fifth resetting member 260. One end of the fifth resetting member 260 abuts against the fixed block 2170, and the other end of the fifth resetting member 260 abuts against the limiting main body 232, so as to play a role of resetting. The sliding block 2150 is provided with a first guide slot 2151 and a second guide slot 2152. The first guide slot 2151 and the second guide slot 2152 are spaced apart. At least part of the driving block 270 is configured to be fitted in the first guide slot 2151. An extension direction of the first guide slot 2151 is perpendicular to a movement direction of the first limiting member 230. The limiting projection 233 is configured to be fitted in second guide slot 2152. An extension direction of the second guide slot 2152 is inclined by a predetermined angle with respect to the extension direction of the first guide groove 2151. The second guide slot 2152 is an inclined slot. With such arrangements, the sliding block 2150 can be driven to move through the fit between the driving block 270 and the two first guide slots 2151. With the movement of the sliding block 2150, the first limiting member 230 can be driven to move to the first evading position under the fit between the second guide slot 2152 and the limiting projection 233.

Correspondingly, the driving block 270 includes a first driving portion 274 and a second driving portion 275. The first driving portion 274 and the second driving portion 275 are connected. The second driving portion 275 is a U-shaped structure. Two ends of the U-shaped structure of the second driving portion 275 form two driving ends of the two first limiting members 230. The two driving ends are configured to be arranged in the first guide slots 2151 of the two sliding blocks 2150, respectively, so that the corresponding sliding block 2150 can be driven to move by each driving end and the first limiting members 230 can be driven to move by the sliding blocks 2150. The first driving portion 274 and the second driving portion 275 are arranged at a predetermined angle. The user may pull the first driving portion 274 to drive the second driving portion 275 to move.

Another embodiment of the present disclosure provides an electric vehicle. The electric vehicle includes a stem assembly. The stem assembly is the stem assembly provided in the above embodiments.

It can be seen from the above descriptions that the above embodiments of the present disclosure achieve the following technical effects: the stem folding mechanism 30, the stem telescoping mechanism 10, and the handle folding mechanism 20 can achieve three-linkage one-button triggering operations, which makes the folding process more convenient and gives the user more comfortable experiences; the three folding processes can cooperate in pairs. For example, the stem telescoping mechanism may be not provided, and the stem folding mechanism 30 and the handle folding mechanism 20 may be configured to have two-linkage one-button triggering operations, thus improving the convenience of operation.

It needs to be noted that the terms used here are intended only to describe specific embodiments, but are not intended to limit exemplary embodiments of the present disclosure. As used herein, the singular forms are intended to include the plural forms as well, unless the context clearly indicates otherwise. In addition, it should be further understood that the terms "include" and/or "comprise," when used in the specification, specify the presence of features, steps, operations, devices, components, and/or their combinations.

Unless otherwise specified, relative arrangements of components and steps, numerical expressions, and values described in these embodiments do not limit the scope of the present disclosure. Meanwhile, it should be understood that, in order to facilitate the description, sizes of respective parts illustrated in the drawings are not drawn according to an actual proportional relationship. Technologies, methods, and devices known by those of ordinary skill in the art may not be discussed in detail, but in appropriate situations, the technologies, methods, and devices should be regarded as part of the specification. In all the examples illustrated and discussed herein, any specific value should be construed as merely illustrative and not as a limitation. Thus, other examples of exemplary embodiments may have different values. It is to be noted that, similar reference numerals and letters denote similar items in the following drawings, and therefore, once an item is defined in one drawing, there is no need for further discussion in the subsequent drawings.

In the description of the present disclosure, it will be appreciated that locative or positional relations indicated by "front, back, up, down, left, and right", "horizontal, vertical, perpendicular, and horizontal", "top and bottom" and other terms are locative or positional relations illustrated on the basis of the drawings, which are intended only to make it convenient to describe the present disclosure and to simplify the description. In the absence of contrary description, the term of locality does not indicate or imply that the referred device or element must have a specific location and must be constructed and operated with the specific location, and accordingly it cannot be understood as a limitation to the present disclosure. The terms of locality "inner and outer" refer to inner and outer with respect to each component's own contour.

For ease of description, spatial relative terms such as "over", "above", "on an upper surface" and "upper" may be used herein for describing a spatial position relation between a device or feature and other devices or features illustrated in the drawings. It will be appreciated that the spatial relative terms are intended to contain different orientations in usage or operation other than the orientations of the devices described in the drawings. For example, if a device in the drawings is inverted, devices described as "above other devices or structures" or "over other devices or structures" will be located as "below other devices or structures" or "under other devices or structures". Thus, an exemplary term "above" may include two orientations, namely "above" and "below". The device may be located in other different manners (rotated by 90 degrees or located in other orientations), and spatial relative descriptions used herein are correspondingly interpreted.

In addition, it needs to be noted that, the use of the terms "first", "second", and the like to define parts is merely for the distinction between the corresponding parts. Unless otherwise stated, the above terms have no special meanings, and thus cannot be construed as limiting the protection scope of the present disclosure.

The above are merely preferred embodiments of the present disclosure, and are not used to limit the present disclosure. For those skilled in the art, the present disclosure may have various alterations and changes. Any alteration, equivalent replacement, improvement, and the like made within the spirit and principle of the present disclosure all fall within the protection scope of the present disclosure.

What is claimed is:

1. A stem assembly, comprising:
    a stem telescoping mechanism comprising a first hollow tube, a second hollow tube, and a locking mechanism, the locking mechanism having a locked state and a movable state, the second hollow tube being configured to be fixedly connected to the first hollow tube when the locking mechanism is in the locked state, and to be movably arranged in the first hollow tube when the locking mechanism is in the movable state;
    a handle folding mechanism arranged to the stem telescoping mechanism, the handle folding mechanism comprising a handle assembly and a first limiting member, the first limiting member being movably arranged, and having a first limiting position and a first evading position, at least part of the first limiting member being configured to be engaged with the handle assembly to restrict a movement of the handle assembly when the first limiting member is at the first limiting position, and the first limiting member being configured to evade the handle assembly to allow the handle assembly to be movably arranged when the first limiting member is at the first evading position; and
    a driving mechanism connected to both the locking mechanism and the first limiting member, and configured to be operated to control the stem telescoping mechanism and the handle folding mechanism to synchronously move.

2. The stem assembly according to claim 1, wherein the driving mechanism comprises:

a driving block arranged to the handle folding mechanism, having a driving end drivingly connected to the first limiting member, and configured to drive the handle assembly to move.

3. The stem assembly according to claim 2, wherein the driving mechanism further comprises:
a driving rope having an end connected to the driving block and another end connected to the locking mechanism, and configured to control a movement of the locking mechanism when the driving block is operated to pull the driving rope.

4. The stem assembly according to claim 1, wherein the stem assembly further comprises:
a stem folding mechanism comprising a first folding seat, a second folding seat, and a limiting structure, the limiting structure comprising a second limiting member, the second folding seat being arranged to an end of the stem telescoping mechanism away from the handle folding mechanism, the second limiting member being movably arranged to the first folding seat, and the second limiting member having a second limiting position and a second evading position,
wherein the second limiting member is configured to be engaged with the second folding seat to restrict a movement of the second folding seat when the second limiting member is at the second limiting position, and to evade the second folding seat to allow the second folding seat to be rotatably arranged to the first folding seat when the second limiting member is at the second evading position.

5. The stem assembly according to claim 4, wherein the stem telescoping mechanism further comprises a first driving member, and the first driving member is arranged to an end of the second hollow tube away from the handle folding mechanism, so as to allow the second limiting member to move to the second evading position when the second hollow tube in the first hollow tube moves until the first driving member abut against at least part of the limiting structure.

6. The stem assembly according to claim 5, wherein the limiting structure further comprises:
a folding driving assembly having a driving end configured to be drivingly connected to the second limiting member, the first driving member being configured to abut against the folding driving assembly, and further to drive the second limiting member to move through the folding driving assembly.

7. The stem assembly according to claim 1, wherein the locking mechanism comprises:
a first locking structure movably arranged in an inner cavity of the first hollow tube, connected to the second hollow tube, and having a first locked state and a first movable state,
wherein at least part of the first locking structure is configured to abut against an inner wall of the first hollow tube to restrict a movement of the second hollow tube when the first locking structure is in the first locked state, and the first locking structure is configured to be spaced apart from at least part of the first hollow tube, to allow the second hollow tube to be movably arranged in the inner cavity of the first hollow tube, when the first locking structure is in the first movable state.

8. The stem assembly according to claim 7, wherein the driving mechanism comprises a driving block and a driving rope, and the driving block is drivingly connected to the first limiting member, and the driving rope is connected to the driving block; and
the first locking structure comprises:
a first push rod connected to the driving rope; and
a first locking block, the first push rod being configured to abut against the first locking block, and to push the first locking block to move to a first locked position or a first evading position,
wherein the first locking block is configured to abut against the inner wall of the first hollow tube, to allow the first locking structure to be in the first locked state, when the first locking block is at the first locked position, and to evade the inner wall of the first hollow tube, to allow the first locking structure to be in the first movable state, when the first locking block is at the first evading position.

9. The stem assembly according to claim 1, wherein a tube wall of the first hollow tube is provided with an engaging hole, and the locking mechanism further comprises:
a second locking structure connected to the second hollow tube, the second locking structure being movably arranged in an inner cavity of the first hollow tube, and the second locking structure having a second locked state and a second movable state,
wherein at least part of the second locking structure is configured to extend into the engaging hole to restrict a movement of the second hollow tube when the second locking structure is in the second locked state, and the second locking structure is configured to evade the engaging hole, to allow the second hollow tube to move in the first hollow tube when the second locking structure is in the second movable state.

10. The stem assembly according to claim 9, wherein the driving mechanism comprises a driving block and a driving rope, the driving block is drivingly connected to the first limiting member, and the driving rope is connected to the driving block; and
the second locking structure comprises:
a second push rod connected to the driving rope; and
a second locking block connected to the second push rod, the second locking block being provided with a locking projection, and the second push rod being configured to push the second locking block to move to a second locked position or a second evading position,
wherein the locking projection is configured to be engaged into the engaging hole, to the second locking structure to be in the second locked state, when the second locking block is at the second locked position, and to evade the engaging hole, to allow the second locking structure to be in the second movable state, when the second locking block is at the second evading position.

11. The stem assembly according to claim 1, wherein the handle folding mechanism further comprises a mounting housing, two handle assemblies are provided, the two handle assemblies are arranged to two opposite ends of the mounting housing, and the first limiting member is arranged between the two handle assemblies;
at least part of the first limiting member is configured to be engaged with the two handle assemblies to restrict movements of the two handle assemblies when the first limiting member is at the first limiting position, and the first limiting member is configured to evade the two handle assemblies, to allow the two handle assemblies to be movably arranged to the mounting housing, when the first limiting member is at the first evading position.

12. An electric vehicle, comprising a stem assembly, the stem assembly comprises:
- a stem telescoping mechanism comprising a first hollow tube, a second hollow tube, and a locking mechanism, the locking mechanism having a locked state and a movable state, the second hollow tube being configured to be fixedly connected to the first hollow tube when the locking mechanism is in the locked state, and to be movably arranged in the first hollow tube when the locking mechanism is in the movable state;
- a handle folding mechanism arranged to the stem telescoping mechanism, the handle folding mechanism comprising a handle assembly and a first limiting member, the first limiting member being movably arranged, and having a first limiting position and a first evading position, at least part of the first limiting member being configured to be engaged with the handle assembly to restrict a movement of the handle assembly when the first limiting member is at the first limiting position, and the first limiting member being configured to evade the handle assembly to allow the handle assembly to be movably arranged when the first limiting member is at the first evading position; and
- a driving mechanism connected to both the locking mechanism and the first limiting member, and configured to be operated to control the stem telescoping mechanism and the handle folding mechanism to synchronously move.

13. The electric vehicle according to claim 12, wherein the driving mechanism comprises:
- a driving block arranged to the handle folding mechanism, having a driving end drivingly connected to the first limiting member, and configured to drive the handle assembly to move.

14. The electric vehicle according to claim 13, wherein the driving mechanism further comprises:
- a driving rope having an end connected to the driving block and another end connected to the locking mechanism, and configured to control a movement of the locking mechanism when the driving block is operated to pull the driving rope.

15. The electric vehicle according to claim 12, wherein the stem assembly further comprises:
- a stem folding mechanism comprising a first folding seat, a second folding seat, and a limiting structure, the limiting structure comprising a second limiting member, the second folding seat being arranged to an end of the stem telescoping mechanism away from the handle folding mechanism, the second limiting member being movably arranged to the first folding seat, and the second limiting member having a second limiting position and a second evading position,
- wherein the second limiting member is configured to be engaged with the second folding seat to restrict a movement of the second folding seat when the second limiting member is at the second limiting position, and to evade the second folding seat to allow the second folding seat to be rotatably arranged to the first folding seat when the second limiting member is at the second evading position.

16. The electric vehicle according to claim 15, wherein the stem telescoping mechanism further comprises a first driving member, and the first driving member is arranged to an end of the second hollow tube away from the handle folding mechanism, so as to allow the second limiting member to move to the second evading position when the second hollow tube in the first hollow tube moves until the first driving member abut against at least part of the limiting structure.

17. The electric vehicle according to claim 16, wherein the limiting structure further comprises:
- a folding driving assembly having a driving end configured to be drivingly connected to the second limiting member, the first driving member being configured to abut against the folding driving assembly, and further to drive the second limiting member to move through the folding driving assembly.

18. The electric vehicle according to claim 12, wherein the locking mechanism comprises:
- a first locking structure movably arranged in an inner cavity of the first hollow tube, connected to the second hollow tube, and having a first locked state and a first movable state,
- wherein at least part of the first locking structure is configured to abut against an inner wall of the first hollow tube to restrict a movement of the second hollow tube when the first locking structure is in the first locked state, and the first locking structure is configured to be spaced apart from at least part of the first hollow tube, to allow the second hollow tube to be movably arranged in the inner cavity of the first hollow tube, when the first locking structure is in the first movable state.

19. The electric vehicle according to claim 18, wherein the driving mechanism comprises a driving block and a driving rope, and the driving block is drivingly connected to the first limiting member, and the driving rope is connected to the driving block; and
the first locking structure comprises:
- a first push rod connected to the driving rope; and
- a first locking block, the first push rod being configured to abut against the first locking block, and to push the first locking block to move to a first locked position or a first evading position,
- wherein the first locking block is configured to abut against the inner wall of the first hollow tube, to allow the first locking structure to be in the first locked state, when the first locking block is at the first locked position, and to evade the inner wall of the first hollow tube, to allow the first locking structure to be in the first movable state, when the first locking block is at the first evading position.

20. The electric vehicle according to claim 12, wherein a tube wall of the first hollow tube is provided with an engaging hole, and the locking mechanism further comprises:
- a second locking structure connected to the second hollow tube, the second locking structure being movably arranged in an inner cavity of the first hollow tube, and the second locking structure having a second locked state and a second movable state,
- wherein at least part of the second locking structure is configured to extend into the engaging hole to restrict a movement of the second hollow tube when the second locking structure is in the second locked state, and the second locking structure is configured to evade the engaging hole, to allow the second hollow tube to move in the first hollow tube when the second locking structure is in the second movable state.

* * * * *